United States Patent [19]

Campbell et al.

[11] 4,200,862
[45] Apr. 29, 1980

[54] APPLIANCE CONTROL

[75] Inventors: David C. Campbell; David R. Thompson, both of Fife, Scotland

[73] Assignee: Pico Electronics Limited, Fife, Scotland

[21] Appl. No.: 865,350

[22] Filed: Dec. 28, 1977

[30] Foreign Application Priority Data

Jan. 7, 1977 [GB] United Kingdom .................. 638/77
May 9, 1977 [GB] United Kingdom .............. 19428/77

[51] Int. Cl.² ............................................. H04B 3/54
[52] U.S. Cl. ................................. 340/310 A; 307/3; 340/695; 340/310 CP
[58] Field of Search ........ 340/310 A, 310 CP, 310 R, 340/171 R; 325/394; 307/3; 179/2.5 R

[56] References Cited

U.S. PATENT DOCUMENTS

| 3,558,902 | 1/1971 | Casey | 340/310 A |
| 3,689,886 | 9/1972 | Durkee | 340/310 A |
| 3,964,047 | 6/1976 | Antonaccio | 340/310 A X |
| 4,024,528 | 5/1977 | Boggs et al. | 340/310 A |

*Primary Examiner*—John W. Caldwell, Sr.
*Assistant Examiner*—Daniel Myer
*Attorney, Agent, or Firm*—Gajarsa, Liss & Conroy

[57] ABSTRACT

An appliance control system comprises a data transmitter and plurality of slave units plugged into outlet sockets of a power main of a building, appliances being coupled to the slave units. The transmitter housing includes a data input arrangement by which slave unit addresses and operation signal can be input and means for producing therefrom digital address and operation signals injected onto the main for receipt by the slave units. Each slave unit is enabled by a digital signal complying its address to effect an appliance operation as defined by a received digital operation signal.

31 Claims, 21 Drawing Figures

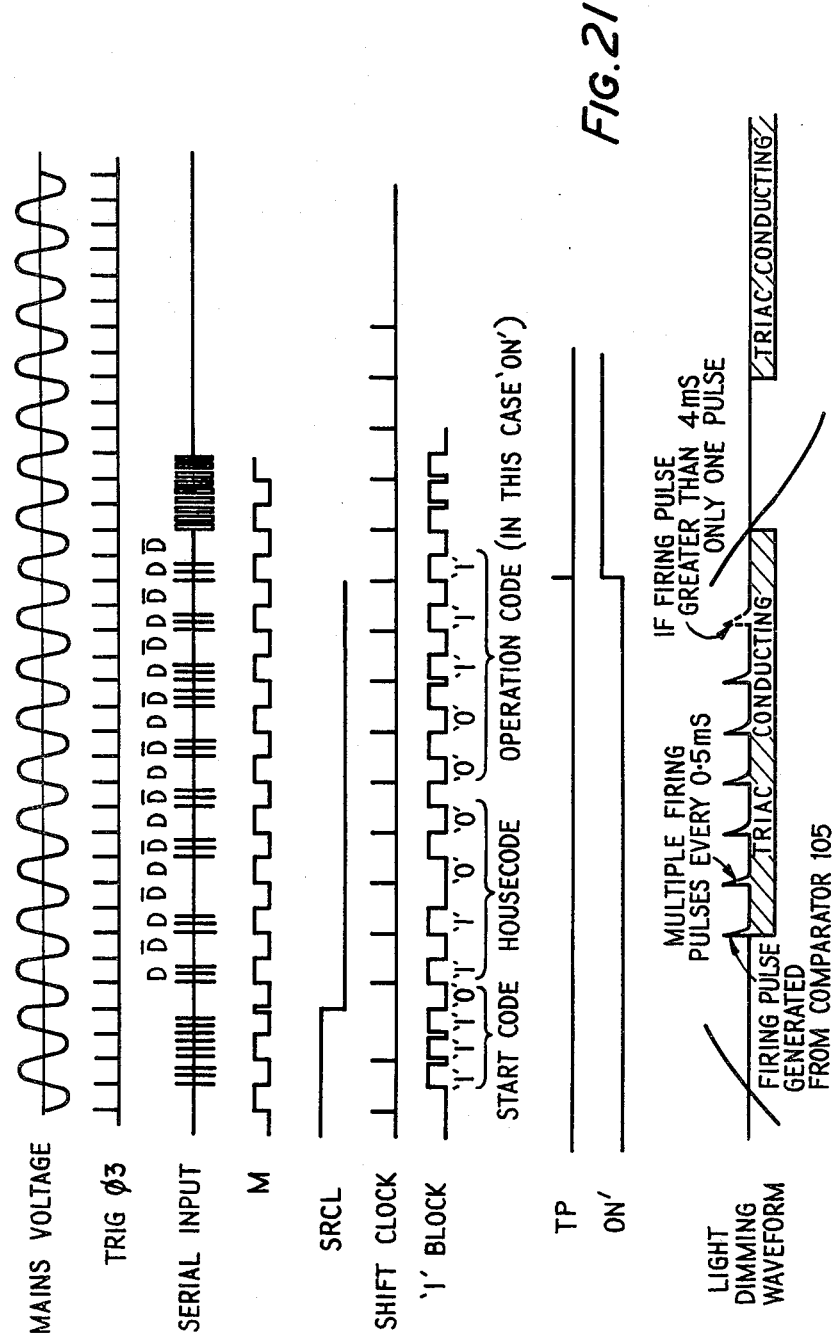

APPLIANCE CONTROL

BACKGROUND OF THE INVENTION

This invention relates to electrical appliance control within a building and has particular application to appliance control within a domestic building.

Conventionally, electrical appliance control within a building is achieved simply by the use of the existing power main together with switches at fixed locations and switches on the appliances. Remote control is not conventionally available other than by use of the switches at the fixed locations and, in recent times, by an ultrasonic link directly to a specific appliance, such as a television receiver. The problem exists, therefore, of providing for a more flexible remote control of electrical appliances in a building. According to the invention, a solution to this problem resides in the use of control signals supplied to the appliances via the power main.

Control systems have been disclosed in the prior art (so-called ripple control systems) in which devices such as recording meters, security systems and street lamps can be controlled from remote transmitters permanently connected to the power supply system supplying such devices. It appears that such systems have been used only for public utilities, such as electricity boards, and are not suitable for domestic use.

SUMMARY OF THE INVENTION

According to one aspect of the invention there is provided an electrical appliance control system, characterised by a transmitter unit having input means for entering the address of a slave unit and means for generating a digital address signal representing the defined slave unit address and modulated on a carrier having a frequency a plurality of times greater than the frequency of the power main, the transmitter unit being coupled to the main within the building to inject said digital address signal onto the main, the or each slave unit being coupled to the main within the building and comprising means for defining an address for that slave unit and means responsive to said digital address signal, when present on the main, to render the slave unit operable to effect an appliance power supply control operation when the responsive means detects that the digital address signal corresponds to the defined address of said slave unit, at least one of the transmitter and slave units being releasably couplable to power outlets of the main so that at least that unit may be used optionally at various places within the building.

In preferred embodiments the transmitter unit also has means for defining an appliance operation, e.g. 'ON' or 'OFF', and producing a digital operation signal representing the defined operation and modulated on a carrier having a frequency a plurality of times greater than the frequency of the power main, the transmitter unit being coupled to the main to inject said digital operation signal onto the main, a slave unit when rendered operable by the digital address signal being responsive to the digital operation signal to cause the controlling means to function in dependence upon the content of the digital operation signal.

There is also preferably incorporated into the digital signals a house or system code which can be unique to that system. The slave unit must then decode a given system code before it responds to the device or operation data in the signals. In this way interference between neighbouring systems, for example different systems used in the same building or in the same street if electrically coupled, can be reduced.

In order to improve the noise immunity of the system, the digital signal preferably comprises data in its logical true and logical inverse forms. The slave unit then preferably has a comparator to compare the true and inverse data forms and only responds when correspondence is detected by the comparator.

According to a preferred embodiment pulse duration coding is employed, the digital signal comprising a plurality of pulses, each pulse comprising a number of carrier cycles, the number of cycles in a pulse defining the logic value of that pulse, the slave unit having means for counting the carrier cycles in each pulse and interpreting the logic value of it on the basis of whether the number of carrier cycles falls within the first or second of two different nonoverlapping ranges of numbers, such ranges being for example between zero and 47, and between 48 and 72. This method of data transmission is found to minimise the effects of interference on the transmission of data along a power main.

It is also found advantageous for the pulses to be transmitted close to the zero crossing of the mains so as to limit interference from transients in the mains wiring, for example originating from thyristor type controls close by; which occur predominantly at high mains voltages. So the pulses preferably occur in the region of zero crossings of the power main signal and preferably within periods containing a zero crossing and each of a duration no greater than one eighth (preferably one tenth) of a half cycle of the power main.

According to another preferred embodiment of the invention, a slave unit is provided with means for operating a switched appliance manually, without using the transmitter unit. The slave unit is for this purpose preferably provided with sense means for sensing a condition of the appliance indicative that a power switch of the appliance has been operated.

According to a second aspect of the invention, there is provided a transmitter unit for use in the system of the first aspect, the unit comprising means for receiving a signal defining a slave unit address and an appliance operation, means coupled to the receiving means for generating digital signals comprising pulses of carrier frequency in digital code defining said address and said operation, and electrical plug pins for plugging the signal output of the unit into a domestic main socket to inject said digital signals onto the main.

According to a third aspect of the invention, there is provided a slave unit for controlling an appliance in a system according to the first aspect, when having a transmitter unit according to the second aspect, the slave unit comprising electrical plug pins for plugging the slave unit into a domestic mains socket, means for connecting an appliance to the unit, a current control device coupled between the pins and the connecting means to control the operation of the appliance, means defining an address for the slave unit, and means responsive to said digital signals coupled to said pins, the responsive means including a comparator for comparing the address conveyed by the digital address signal with the address defined by the defining means and for producing a signal for controlling the current control device in dependence upon the defined appliance operation when correspondence of addresses is found.

According to a fourth aspect of the invention, there is provided a slave unit for controlling an appliance in a system according to the first aspect, when having a transmitter unit according to the second aspect, the slave unit comprising means for coupling the slave unit to a domestic main, means for connecting a lighting appliance to the unit, a lighting appliance dimming control device coupled between the coupling means and the connecting means to control the brightness of the appliance, means defining an address for the slave unit, and means responsive to said digital signals coupled to said coupling means, the responsive means including a comparator for comparing the address conveyed by the digital address signal with the address defined by the defining means and for producing a signal for controlling the control device in dependence upon the defined appliance operation when correspondence of addresses is found.

The transmitter unit and slave units are preferably provided with transformers coupled between the signal paths of the units and the main for substantially isolating components of the units from the main whilst allowing the digital signals to be passed between the units and the main via those transformers.

For a better understanding of the invention and to show how the same may be carried into effect, reference will now be made, by way of example, to the accompanying drawings.

DETAILED DESCRIPTION OF DRAWINGS

Figure 1:
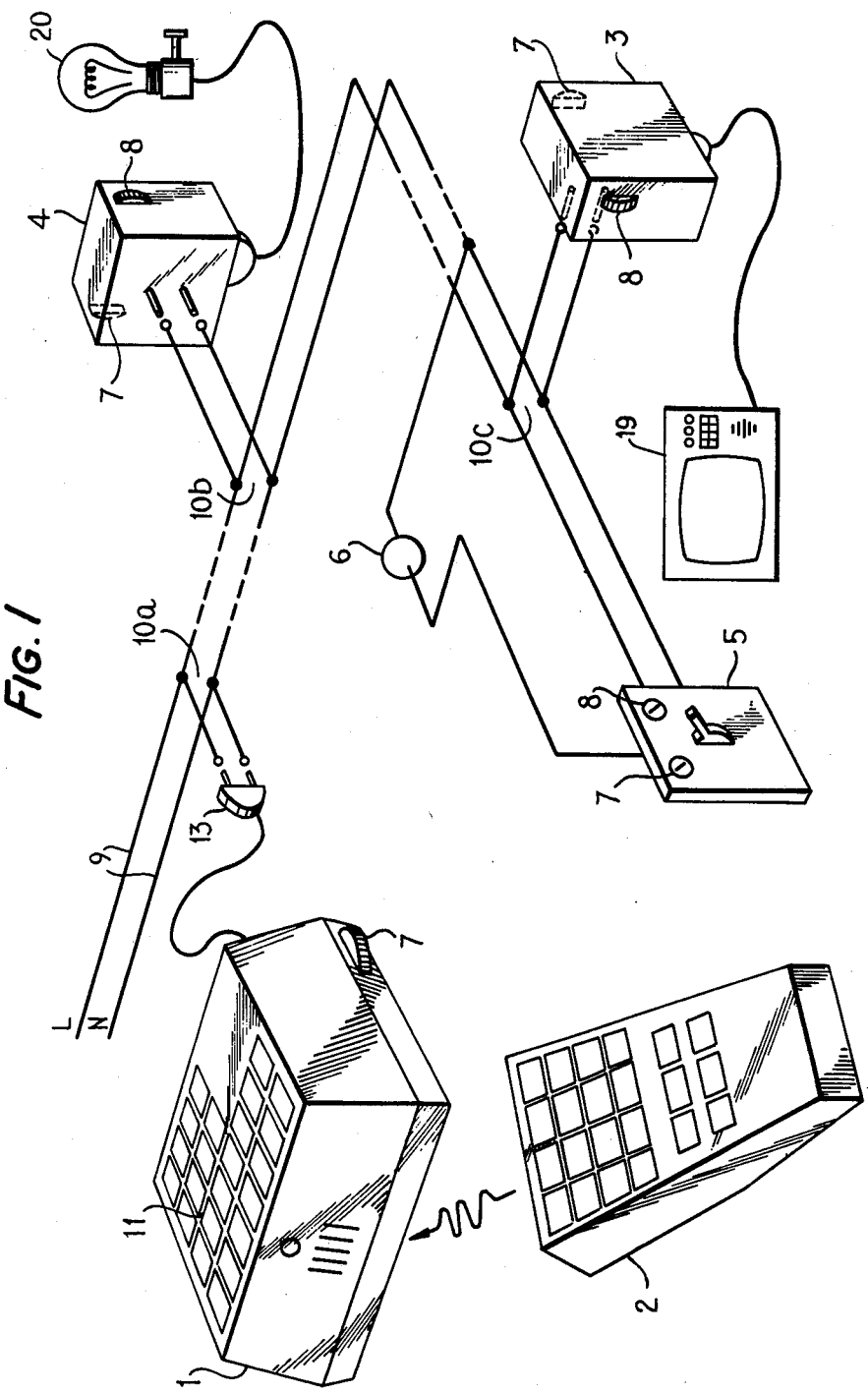
FIG. 1 is a schematic diagram of transmitter units and slave units according to the invention together with a power main and appliances.

FIG. 1 is a diagrammatic representation of several units of a domestic appliance control system according to the invention.

In FIG. 1, the power main (9) of a building has power sockets 10a, 10b, 10c, into which can be releasably plugged a table top transmitter 1 and slave units 3 (an appliance unit) and 4 (a dimmer unit). Electrical appliances, such as the television set 19 and the lamp 20, are releasably plugged into these slave units. In addition to the slave units 3 and 4, a plateswitch dimmer slave unit 5 is incorporated into the system to control lights which are permanently wired onto the main, such as overhead light 6. The table top transmitter has a keyboard 11 by which data concerning the operation of the appliances 6, 19 and 20 can be entered. Such data passes through the mains to the slave units to operate the appropriate appliance. To distinguish between appliances, each slave unit is given an appliance code which is set manually by means of a rotary switch (8) at each slave unit. Another rotary switch (7) is provided both at the slave units and at the table top transmitter in order that a "housecode" can be set, this "housecode" being intended to be unique to the house or building concerned to prevent interference between separate systems which are electrically coupled—for example houses in the same street.

When it is desired to control one of the appliances, the keyboard is operated to key in the appliance code concerned followed by the operation desired, e.g. "on". The transmitter will in consequence develop two digital signals, the first of which represents the appliance code and the second of which represents the desired operation. The house code is added to both digital signals which are passed on to the main in sequence. The first digital signal is conveyed by the main to each slave unit but only one of the slave units will respond to this signal, i.e. the slave unit which contains the house code and appliance code concerned. This particular slave unit will be enabled by the first digital signal, so that when the second digital signal arrives it will execute the demanded operation. Subsequently, that slave unit remains enabled for further operational orders unit such time that another appliance code is called for by the transmitter.

In addition to calling one appliance, an "all" key and a "clear" key are provided to switch on and off the appliances connected to all slave units.

FIG. 1 also shows an auxiliary keyboard unit (the handset 2) which uses ultrasonic transmission to convey data to the table top transmitter unit for subsequent encoding and passage onto the main. Handset 2 transmits the appliance and operation codes to the transmitter unit 1 by way of an ultrasonic signal (using a carrier frequency of, for example, 40 Khz) and an ultrasonic receiver in the transmitter unit 1. The transmitter unit 1 will, as before, add the house code to the signal and will in addition regenerate the pulses with a carrier frequency of, for example, 120 Khz.

Figure 2:
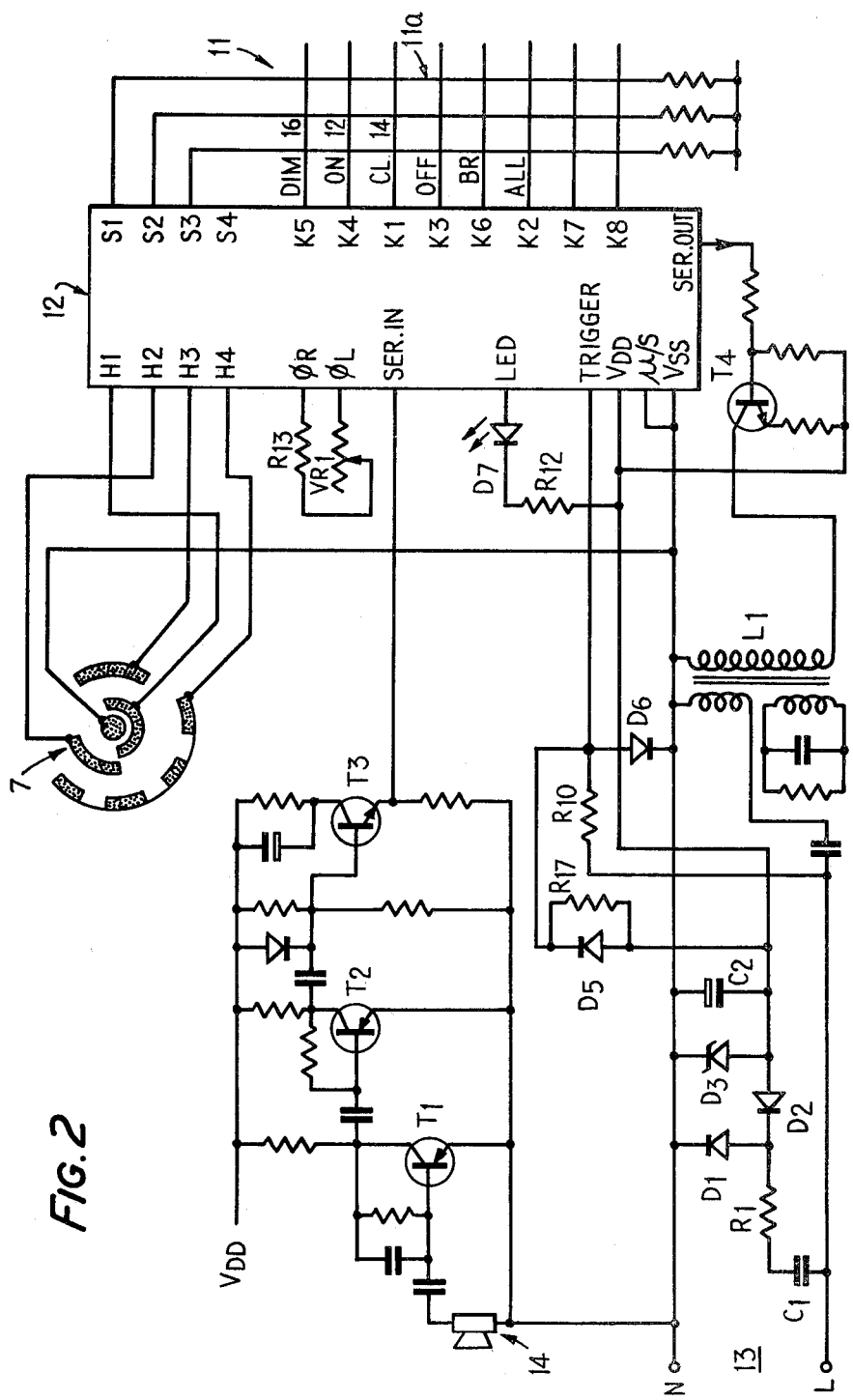
FIG. 2 is a circuit diagram of the table top transmitter unit of FIG. 1.

FIG. 2 is a circuit diagram of the components of the table top transmitter of FIG. 1.

In FIG. 2 the keyboard 11 comprises a matrix 11a of switches having three columns of switches associated with the number keys 1 to 16 and the operation keys DIM, ON, OFF, CLEAR, BRIGHTEN and ALL. An integrated circuit 12, preferably an insulated gate field effect transistor integrated circuit, has facilities for supplying strobe signals $S_1$ to $S_4$ to columns of the matrix of switches of the keyboard. In this embodiment only three columns are provided so that only signals $S_1$ to $S_3$ are connected to the matrix. Data represented by a key depression closing a switch of the matrix is thus transferred as a voltage level from one of the strobe signals to the integrated circuit 12, where it is converted to a serial five bit code which appears at a serial data output "SER.OUT". The output "SER.OUT" is coupled by an amplifier, including a transistor $T_4$, and a transformer L1 to plug pins 13 by which the unit can be releasably connected to any power outlet socket of the power main. By these means the data is injected as a digital signal onto the main. D.C. power supply to terminals $V_{SS}$ and $V_{DD}$ of the integrated circuit is taken from the pins 13 by means of capacitors C1 and C2, resistor R1 and diodes $D_1$, $D_2$ and $D_3$.

A house or system code is defined at the unit by rotary switch 7 of a conventional construction as indicated by FIG. 2. The four bits defined by the switch 7 are taken to input terminals H1 and H4 of the integrated circuit. The four bits of the housecode are added to the data entered via the keyboard and also appear at output "SER.OUT" for injection onto the mains.

It has been found that interference can be reduced by injecting the data bits onto the main near the zero crossing points of the mains voltage. To achieve this, a mains trigger signal is utilised by the integrated circuit and is obtained as a clipped sine wave of 16 V amplitude by way of resistors R10 and R17 and diodes D5 and D6. Resistor R17 ensures that the mains voltage is at zero, the mains trigger is at −5 V, being the threshold of the input "TRIG" of the integrated circuit. This unit therefore operates synchronously with the main.

An additional feature of the transmitter unit is an LED diode D7 which becomes energised when the integrated circuit detects valid input data for transmission.

Resistor R13, variable resistor VR1 and capacitors CR and CL are coupled to terminals $\phi R$ and $\phi L$ of the circuit adjustably to set the frequency of its internal clock which inter alia sets the frequency of the carrier of the digital output signals.

When the hand held transmitter (2) is used in conjunction with the system an ultrasonic serial data signal, representing a key depression, transmitted therefrom is received by an ultrasonic transducer 14, amplified by threestage amplifying circuitry, including transistors T1 to T3, and entered into the integrated circuit 12 at the serial data input "SER.IN". This data is subsequently passed to output "SER.OUT" and thus onto the main after the housecode has been added to the data.

Figure 3:
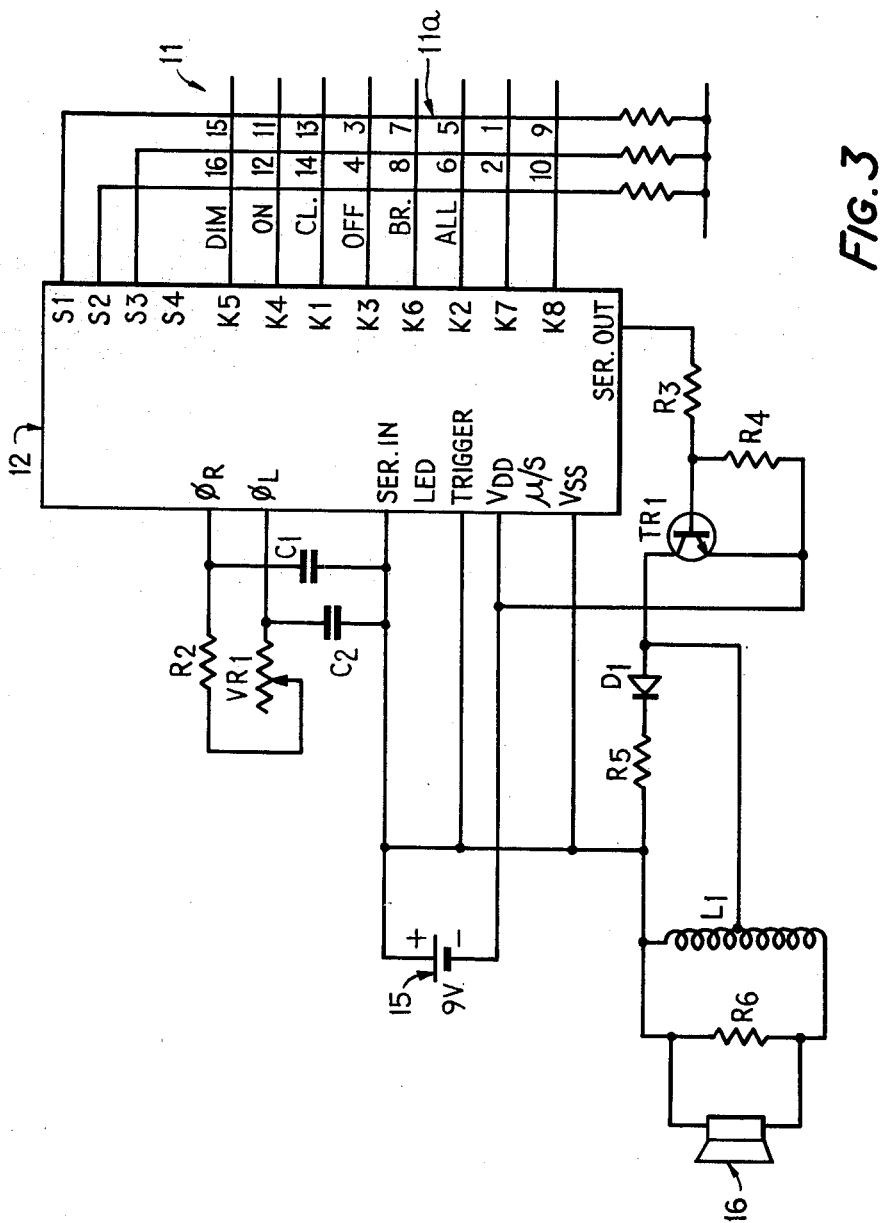
FIG. 3 is a circuit diagram of the hand-held transmitter unit of FIG. 1, FIGS. 4–9 are block circuit diagrams of parts of the integrated circuit of FIGS. 2 and 3, FIGS. 10–12 are timing diagrams of signals received and generated by the integrated circuit of FIGS. 2 and 3.

The hand held transmitter, the circuitry of which is represented schematically in FIG. 3, comprises an integrated circuit 12 of identical form to that employed in FIG. 2. However terminal U/S is not connected to neutral so that it becomes suitable for running off a low voltage d.c. supply provided by a 9 volt battery 15 in that most of the circuit in this condition is deenergised until a key is depressed. A serial bit code for each key depression is set up by the integrated circuit and passed to the output transducer 16.

FIGS. 4 to 9 are block circuit diagrams of the components of the integrated circuit of FIG. 2 and FIGS. 10 to 12 are timing diagrams showing the timing relationships of the control signals and output data signals associated with the integrated circuit of FIG. 2.

A general description of the function of the integrated circuit will now be given, followed by a detailed description of each part.

Figure 6:
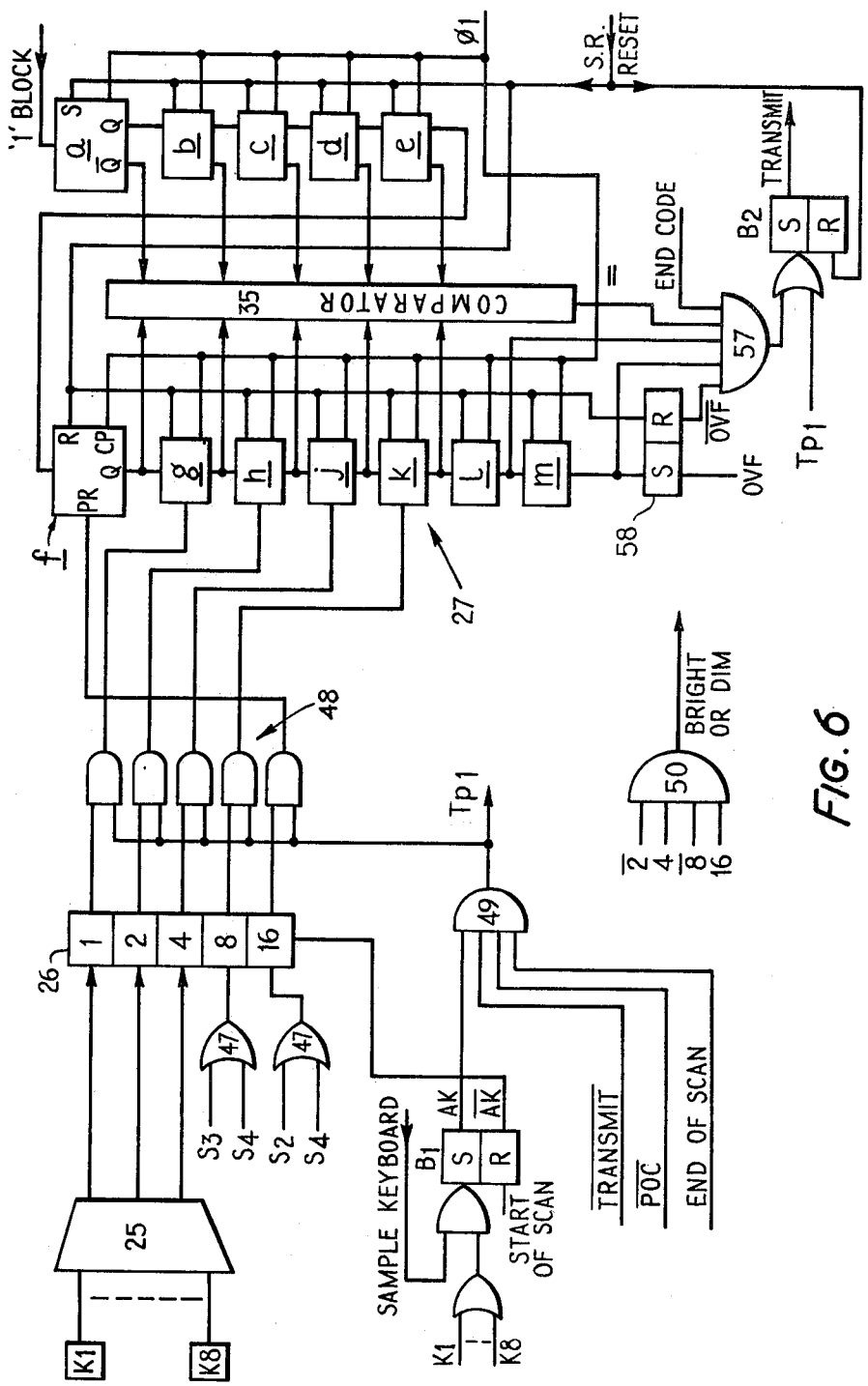

Data entered by the keyboard of the transmitter is encoded and stored as a five bit data signal in the keyboard input logic 25, 26 of FIG. 6, from which it is transferred to stages f to k of input register 27. On receipt of a signal TP2 generated just after the zero crossing of the mains voltage, the five bit data signal, together with a four bit housecode from the rotary switch (encoder) 7, is transferred to a transmission register 22 and subsequently emitted via output gating circuitry 40 (FIG. 7) to the output "SER.OUT." The output signal is synchronised to the zero crossings of the mains voltage, is normally repeated at least once, and has a start code and an end code inserted at appropriate parts. These and other features of the output signal are governed by system control bistables B2 (FIG. 6), B3 and B4 (FIG. 8), a transmission timer (FIG. 8) consisting of a six stage counter 28, and a transmission delay timer 31 (FIG. 7) comprising an eight stage counter. The form of part of a typical message is shown as "SERIAL OUT" in FIG. 2. This example is suitable for a single phase or three phase power main and for this purpose each bit of the message is generated three times in synchronism with one phase, the first occurrence being just after a mains voltage zero crossing and the others after preset time intervals so as to occur approximately at 60° and 120°, i.e. in the region of the zero crossings of the other two phases if present. These repetitions of the bits are controlled by the transmission delay timer 31 (FIG. 7), and the sequencing of successive bits are controlled by the states of the transmission timer (FIG. 8) these states being identified below the waveform of "SERIAL OUT" in FIG. 12. The transmission timer is clocked through its states in synchronism with the zero crossings of one of the phases.

During the first four states of the transmission timer (1 to 4) a start code (1110) is generated. During the next eight states (5 to 12) data representing the housecode in alternate logical true and logical inverse form is sent, and during the next ten states (13 to 22) data representing the operation or address code, similarly in true and inverse form, is sent (FIG. 12 specifically shows as an example one of the operation codes). The message is then repeated at least once under circumstances to be described hereinafter with reference to FIG. 8.

FIGS. 4 to 9 will now be described in more detail.

Figure 4:
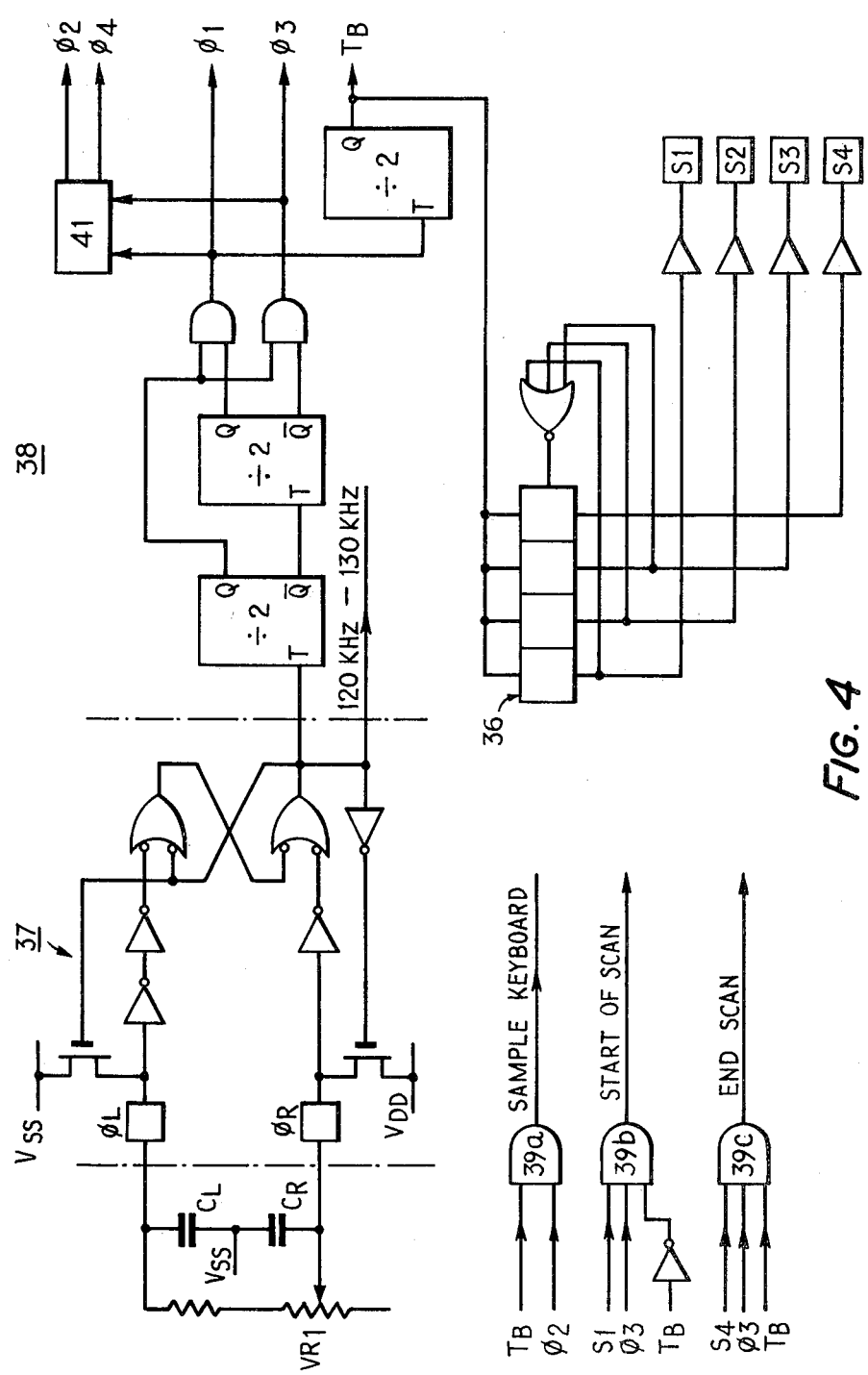

FIG. 4 is a block circuit diagram of clock circuitry including an oscillator 37 designed so that its output frequency is substantially independent of supply voltage. This oscillator produces a stable a.c. waveform adjustable over a frequency range including 120 KHz. The exact value is adjustable by means of resistor VR1 as required. This waveform feeds a clock generator 38 comprising three divide-by-two circuits for producing clock pulses $\phi 1$ and $\phi 3$ and a timing pulse TB. Additional clock pulses $\phi 2$ and $\phi 4$ are produced from $\phi 1$ and $\phi 3$ by a circuit 41 responsive to the leading and trailing edges of $\phi 1$ and $\phi 3$. Clock pulses $\phi 1$ to $\phi 4$ are used for four-phase control of the transistors of the integrated circuit and are also used for control purposes where indicated in the subsequent figures. Pulse TB clocks a strobe counter 36 from which the strobe signals S1 to S4 are generated. These are the signals which strobe the keyboard 11 as described with reference to FIG. 2.

Signals SAMPLE KEYBOARD, START SCAN and END SCAN are produced when appropriate inputs are present at gates 39a, b, c, as shown in FIG. 4.

The time relationships of the timing pulses $\phi 1$, $\phi 3$, TB and S1 to S4 and the principal signals involved in the recognition and entering of keyboard data will now be described in more detail with reference to FIG. 10.

With the transmitter unit adjusted to operate at a carrier frequency of 120 KHz, the time period between the $\phi 1$ pulses is 33.3 $\mu s$ and each pulse $\phi 1$ is 8.33 $\mu s$ wide. Identical dimensions apply to the pulses $\phi 2$, $\phi 3$ and $\phi 4$ but these are 90°, 180° and 270° out of phase with the $\phi 1$ pulses. Pulses $\phi 1$ and $\phi 3$ are shown in the first two lines of FIG. 10, but pulses $\phi 2$ and $\phi 4$ are omitted for clarity. The next line shows TB pulses, which are produced when $\phi 1$ pulses are fed to a ÷2 counter (FIG. 4) and therefore have a frequency half that of the $\phi 1$ pulses. The TB pulses are fed as a clock pulse to the strobe counter 36 (FIG. 4) so that the strobe pulses S1 to S4 have timing relationships as shown in FIG. 10. The period of each of the strobe pulses is 267 μs and each has a duration of 66.7 μs.

Figure 10:
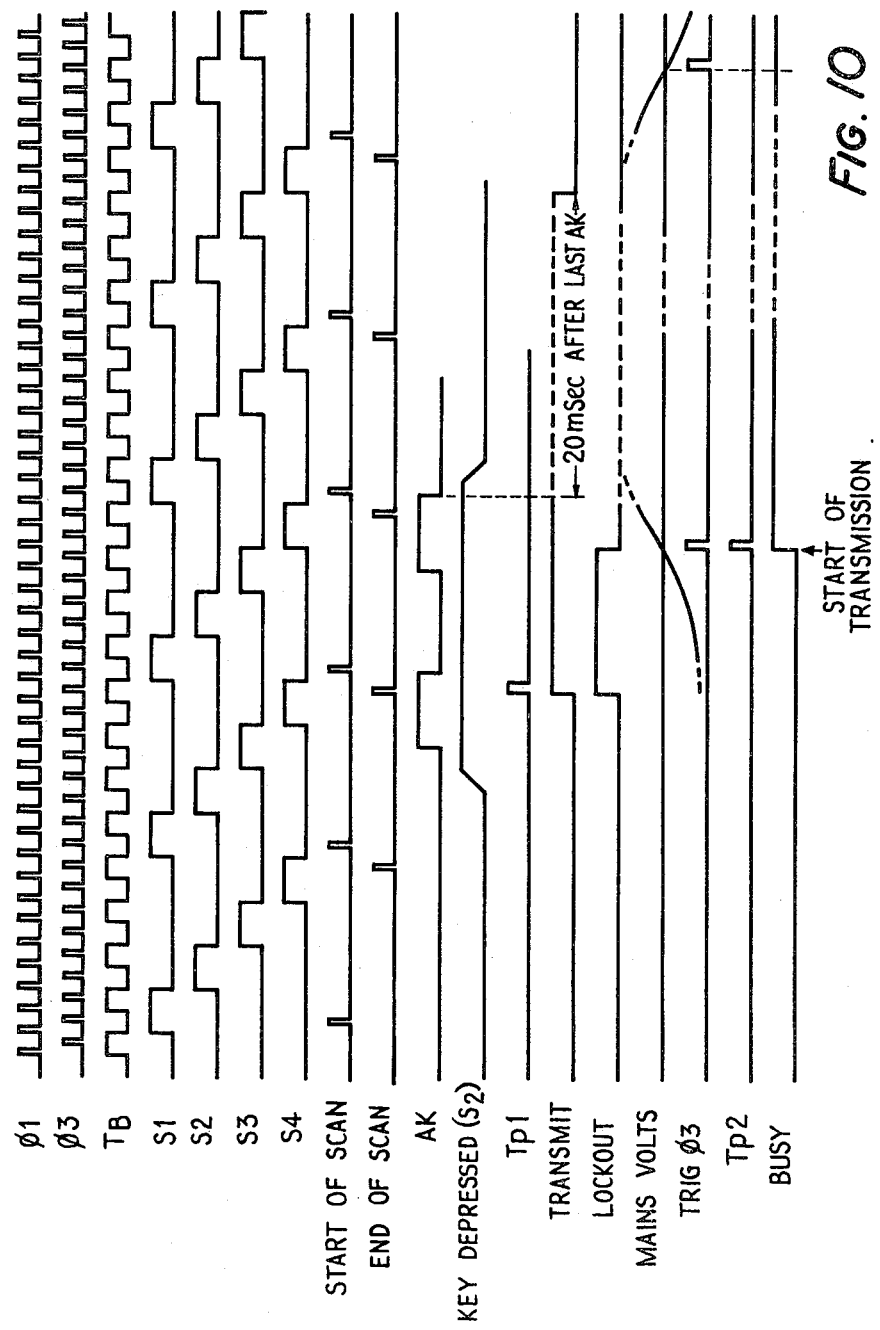

The eighth line of FIG. 10 shows the "START OF SCAN" signal which is produced following the start of each pulse S1 and in synchronism with the φ3 pulses.

The "END OF SCAN" signal is produced towards the end of S4 in synchronism with the φ3 and TB pulses.

Figure 5:
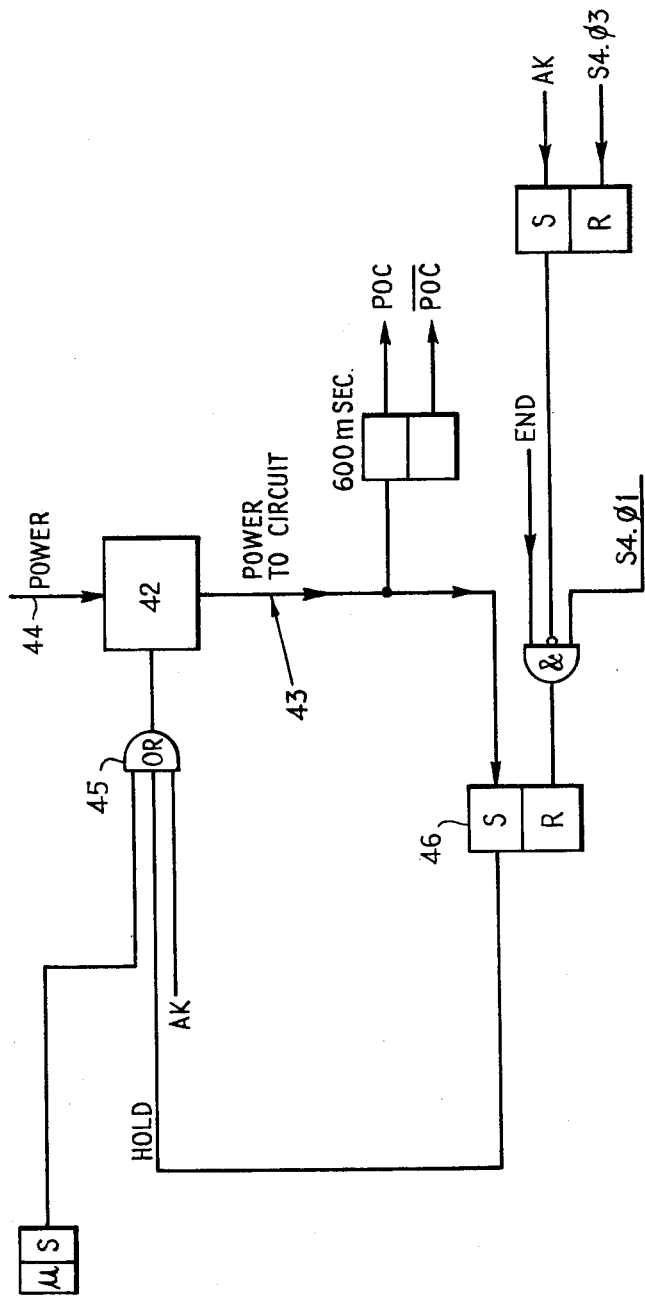

FIG. 5 shows the logic circuitry employed to energise the integrated circuit and to generate a resetting signal POC. A power input 44 to the integrated circuit is connected to the majority of elements of the integrated circuit via a gate 42 and lead 43 so as only to energise these elements when an OR gate 45 receives an input signal. On the other hand the gates 42 and 45 are permanently connected to input 44 as are appropriate elements of the keyboard input logic and the strobe counter so as to allow a signal AK to be developed even though power has not been supplied to lead 43. The integrated circuit 12 for the table top transmitter of FIG. 2 has input U/S connected to VSS thereby keeping it "high" to enable the gate 42 to keep the circuit fully energised all the time. As shown in FIG. 3, however, for the hand held transmitter unit, U/S is not connected, and so power is only sent to the majority of elements of the integrated circuit when AK is "high", that is when a key is depressed. This conserves power in the hand held transmitter unit making it possible to power it usefully by a 9 V battery 15 as shown in FIG. 3. In that case full power is maintained by a bistable 46 until the end of a transmission from the hand held unit.

FIG. 6 shows keyboard input logic and the input register.

Key input terminals K1 to K8 of the integrated circuit are connected to the inputs of a binary encoder 25, the three bit output of which is connected to three stages of a store 26 which also receives information from strobe inputs S2 to S4 via "OR" gates 47. Store 26 is connected via "AND" gates 48 to stages f to k of input register 27. Terminals K1 to K8 are also connected via gating to bistable B1 which produces "any key" signals Ak and AK. Inputs to a gate 49 as shown in FIG. 6 control the generation of pulse TP1 which enables gates 48. An "AND" gate 50 is also so connected to the output of store 26 as to emit a signal whenever it detects a brightening on dimming operation code in the store 26.

A bistable B2 is arranged to be set by the pulse TP1 to produce a signal "TRANSMIT" shown in FIG. 10. Bistable B2 can also be set by a signal from an "AND" gate 57 responsive inter alia to the output of a comparator 35 which is connected to compare the contents of stages f to k with the contents of stages a to e of the input register 27. A bistable 58 is additionally provided to detect input register overflow and its output OVF is connected to one input of the "AND" gate 57.

Figure 7:
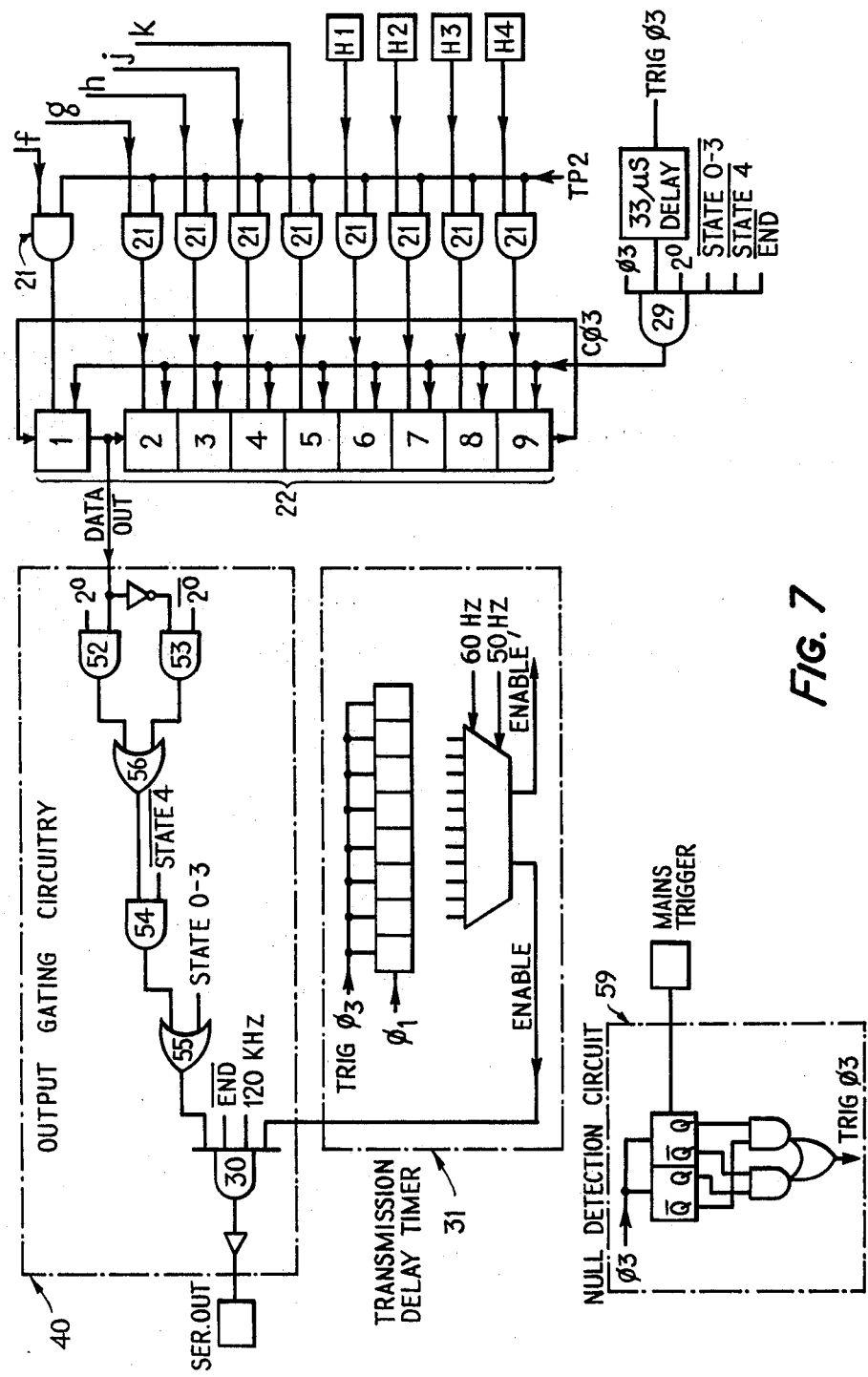

FIG. 7 shows "AND" gates 21 with inputs from stages f to k of the input register 27 of FIG. 6 and from H1 to H4 (the housecode data input terminals). A lead for conveying control signal "TP2" is connected to enable all the gates 21. The outputs of the gates 21 are connected to respective stages 1 to 9 of transmission register 22 which is clocked by the output signal Cφ3 of gate 29 activated by signals as shown in FIG. 7, the form of signal Cφ3 being indicated in FIGS. 11 and 12.

The output of the register 22 is from its first stage (1) and into the output gating circuitry 40, described in more detail later.

Figure 11:
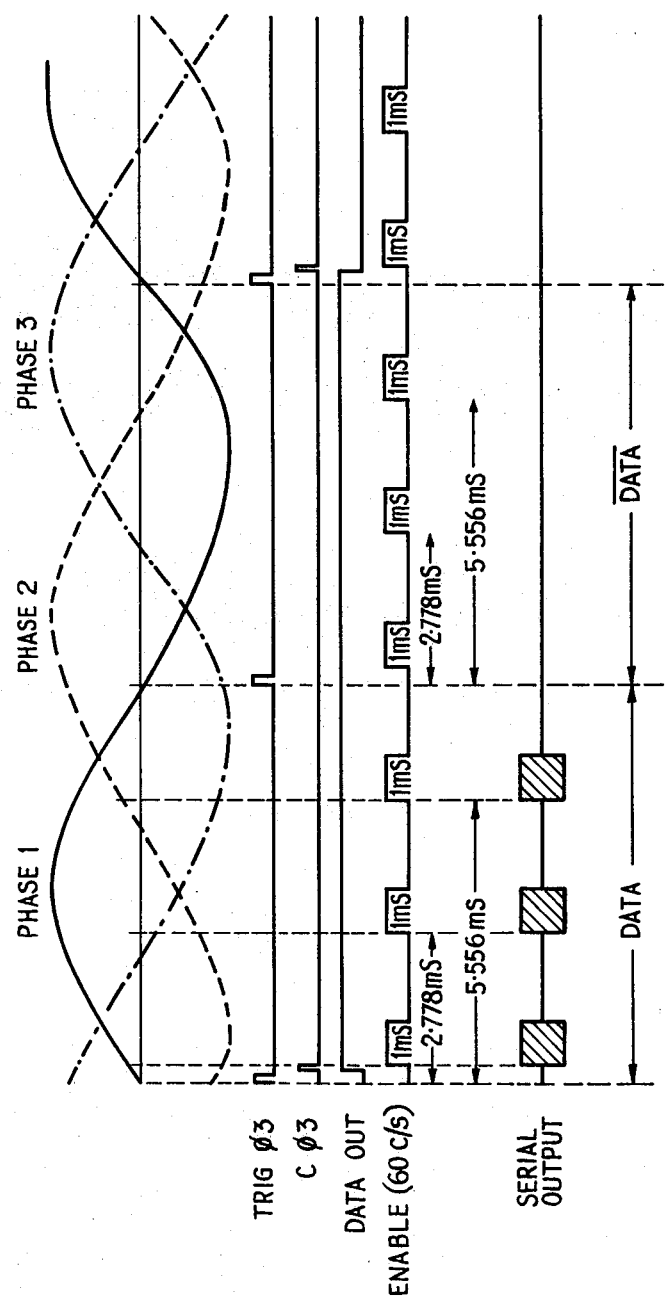

FIG. 7 also shows a Null Detection circuit 59 comprising a two stage counter, connected to the "TRIGGER" input of the integrated circuit, clocked by pulse φ3, and connected to gating elements such that the pulse Trig φ3 is produced at each zero crossing of the mains voltage as indicated in FIG. 11. The pulse Trig φ3 is connected to the reset inputs of transmission delay timer 31 so that the timer 31 is reset at each mains zero crossing. Transmission delay timer 31 comprises an eight stage counter with a clock pulse input of signal φ1, and a decoder producing the signal "ENABLE" (which is illustrated in FIG. 11) and the signal "ENABLE[1]". The output signal "ENABLE" of the decoder is connected to the input of gate 30 of the output gating circuitry 40. The decoder also has 50 Hz or 60 Hz selecting inputs for selecting respective portions of the decoder to give either the delays shown in FIG. 11 or corresponding delays for 50 Hz.

Figure 8:
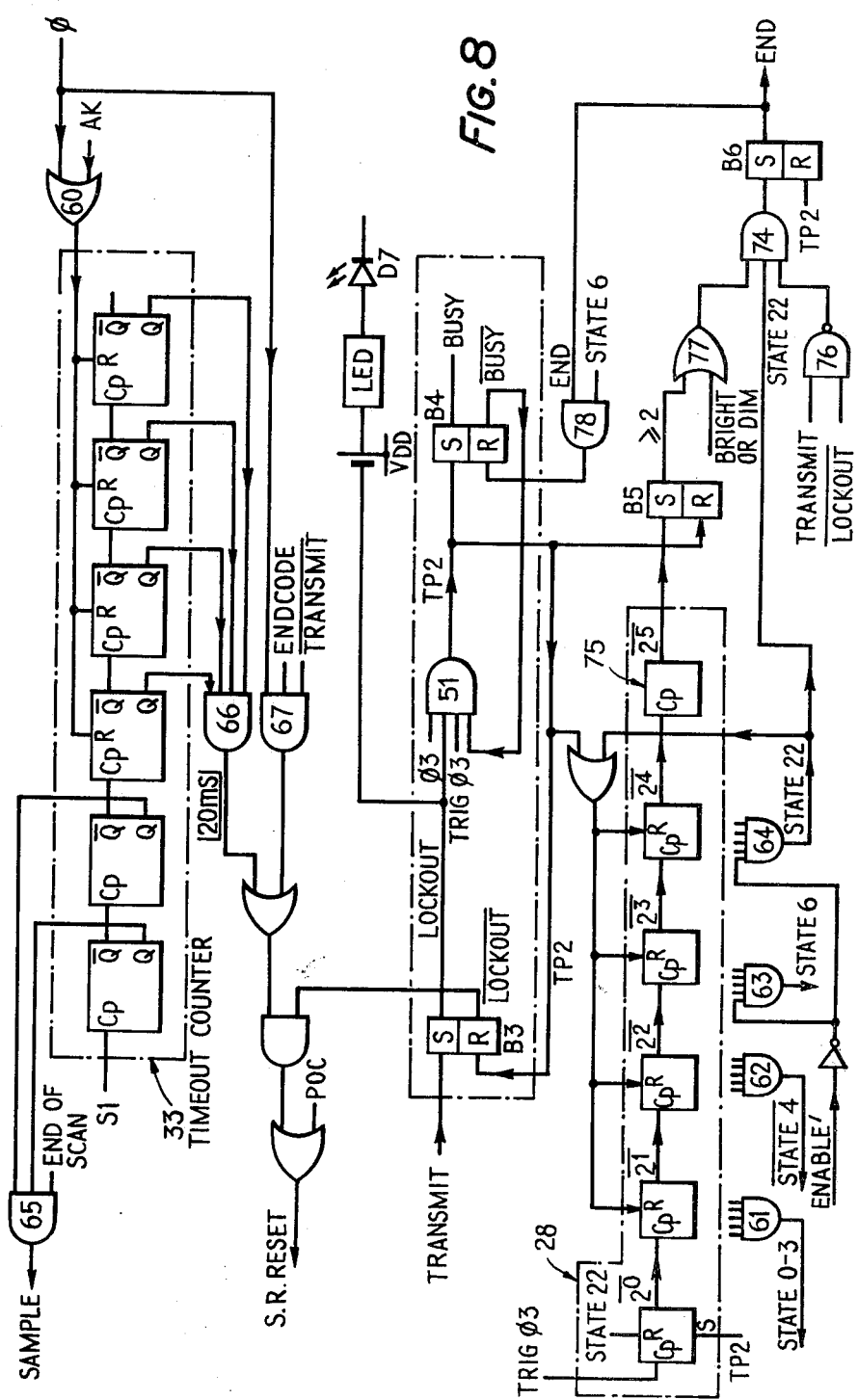

FIG. 8 shows system control bistables B3 (LOCKOUT) and B4 (BUSY) connected together via "AND" gate 51 which, when provided with inputs as shown, produces an output signal TP2, the form of which is shown in FIG. 10, through a transistor, connected to the VDD input of the integrated circuit, to a light emitting diode D7 which indicates that the transmitter is transmitting. FIG. 8 also shows a transmission timer which comprises a six stage counter 28, decoding gates 61 to 64 for decoding states of the counter 28, and bistables B5 ($\geq 2$) and B6 (END) both having reset inputs connected to receive the signal "TP2", B5 being connected to B6 via gating as shown and described in more detail later. FIG. 8 also shows six stage timeout counter 33 which is clocked by the strobe signal S1 and reset each time a key is depressed by the signal AK via "OR" gate 60. Outputs of counter 33 are connected to gate 65 so that the signal "SAMPLE" is generated. Outputs of counter 33 are also connected to gates 66 and 67, the outputs of which are connected to further gates as shown in FIG. 8 to produce signal "S.R. RESET" 20 msec. after the "START OF SCAN" signal is produced, so that bistable B2 (FIG. 6) is not reset by signal "S.R. RESET" until B1 (FIG. 6) has remained reset for 20 msec.

Figure 9:
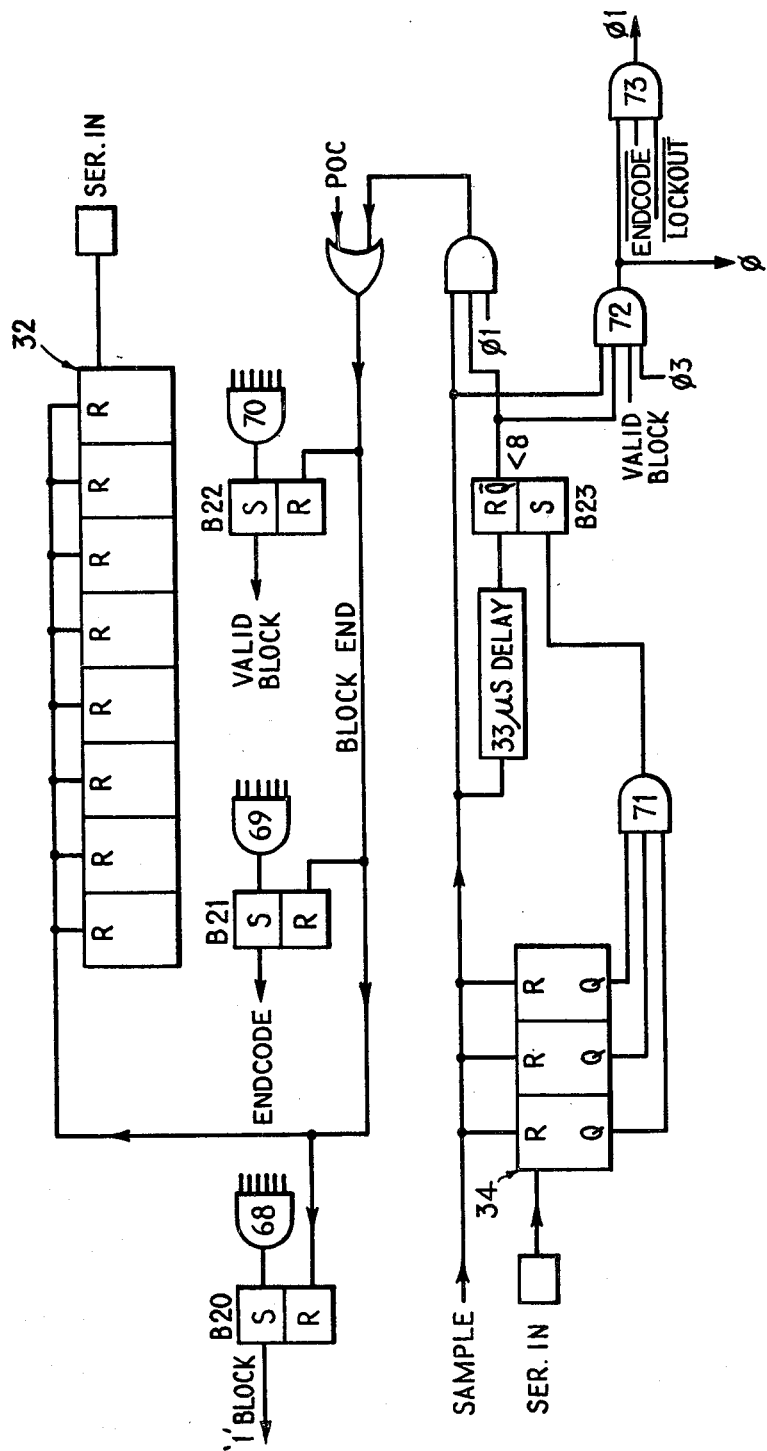

FIG. 9 shows eight stage input code counter 32 clocked by the input signal present at the input "SER. IN" of the integrated circuit. Decoding gates 68, 69 and 70 have outputs connected to set bistables B20, B21 and B22 for generating signals "1 BLOCK", "END CODE" and "VALID BLOCK" respectively as shown in FIG. 9. A signal "BLOCK END" is produced in φ1 time when signal "SAMPLE" is generated (from the circuitry of FIG. 8) and bistable B23 is reset, or when signal POC is generated (from the circuitry of FIG. 5). Signal "BLOCK END" resets counter 32 and bistables B20, B21 and B22.

Input "SER. IN" of the integrated circuit is also connected to three-stage counter 34 the outputs of which counter are connected via "AND" gate 71 to the "set" input of bistable B23. Signals φ and φ' are generated at outputs of "AND" gates 72 and 73 respectively when appropriate inputs as shown in FIG. 9 are present.

It will be noted that the circuitry described above and illustrated in FIG. 9 is only operative in the integrated circuit of the table top transmitter unit (1 in FIG. 1) and then is only used when the hand-held transmitter unit (2 in FIG. 1) is used to send data by an ultra-sonic signal to transducer 14 (FIG. 2) in the table top transmitter unit (1 in FIG. 1).

A general description of the response of the circuit elements described above with reference to FIGS. 4 to 9, to the signals illustrated in FIGS. 10 to 12 will now be given.

Firstly, when power is applied to the transmitter unit 1 (i.e. it is turned "ON"), power is applied to the integrated circuit 12 of FIG. 2 and hence enables "OR" gate 45 (FIG. 5) to enable gate 42 to pass the power along line 43 to the rest of the circuitry of the integrated circuit. The circuitry shown in FIG. 4 thus becomes operative to generate the timing pulses indicated. Each "START OF SCAN" pulse (shown in line 8 of FIG. 10) resets the bistable B1 (FIG. 6), to cause the five-bit store 26 to open in readiness to receive data. The bistable B1 remains reset until a key is depressed when one of strobe signals S1 to S4 is connected to one of terminals K1 to K8 to cause bistable B1 to set and thus close the five-bit store 26, locking in a five bit code representing a unique combination of K1 to K8 and S1 to S4 (defining the precise key depressed). This code has been encoded by the binary encoder 25 and gates 47.

When an "END OF SCAN" pulse (shown in line 9 of FIG. 10) is produced, signal TP1 (shown in FIGS. 10 and 12) is generated if a key was depressed since the last "START OF SCAN" pulse and if bistable B2 is not set. Pulse TP1 loads the five-bit code from store 26 into stages f, g, h, j, k, of input register 27, and also sets bistable B2 which then generates signal "TRANSMIT" (shown in FIG. 10) which inhibits further generation of pulses TP1 as the logic inverse of "TRANSMIT" (i.e. TRANSMIT) is present at the input of gate 49.

Data from the input register 27 is present at gates 21 in FIG. 7 together with data representing the housecode which is entered by way of rotary switch 7 (FIG. 2) to inputs H1 to H4. Control signal TP2 loads the data present at the gates 21 into transmission register 22 (FIG. 7).

Signal TP2 is produced by the gate 51 shown in FIG. 8 just after a zero crossing of the mains, when pulse $\phi 3$ and pulse Trig $\phi 3$ (shown in FIG. 10) are 'high' simultaneously with the lockout bistable B3 being set and the busy bistable B4 being not set.

Signal TP2 also clears four of the six stages of the transmission timer counter 28, shown in FIG. 8, and sets the first stage of the counter so that it counts each zero crossing of the mains (i.e. in response to each Trig $\phi 3$ pulse input).

Further TP2 signals are inhibited as TP2 sets the busy bistable B4. It also resets bistable B6 (END) and B3 (LOCKOUT). B4 stays set whilst transmission is in progress and signifies that data in the transmission register 22 is still being transmitted. Transmit bistable B2 remains set until signal "S.R. RESET" is produced, "S.R. RESET" being produced under the conditions that the lockout bistable B3 has been reset and that 20 milliseconds have elapsed since the end of the last AK signal, that delay being produced by the time out counter 33 (FIG. 8).

Figure 12:
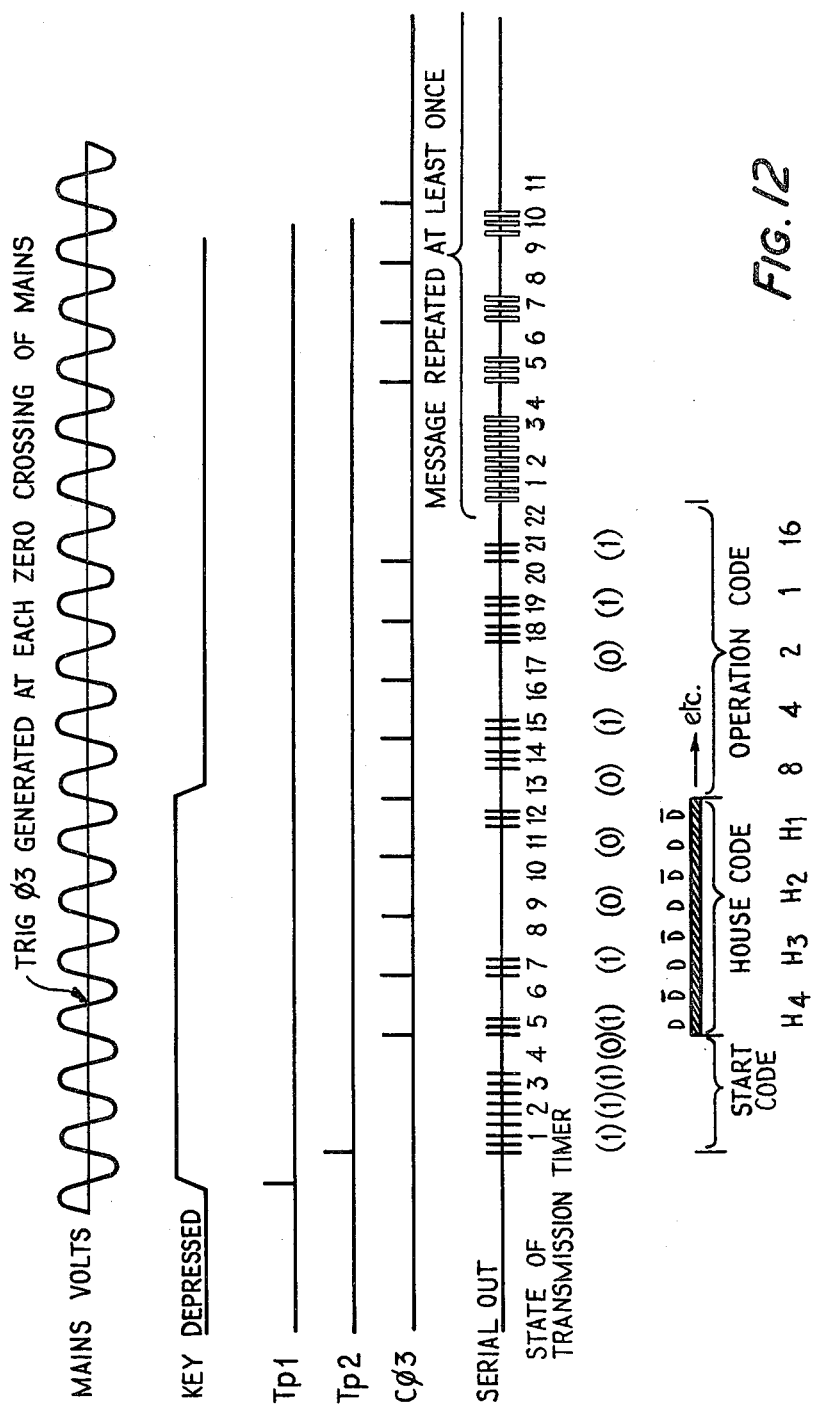

States 1 to 4 of counter 28 are used to send the "start code" (1110), as shown in FIG. 12. On the fifth state of the counter, and every successive odd one, gate 29 is enabled to pass Trig $\phi 3$ pulses which are delayed by 33 $\mu$sec, and are referred to in this delayed form as C$\phi 3$, shown in FIGS. 11 and 12. The pulses "C$\phi 3$" are fed to the transmission register 22 shown in FIG. 7 as the Shift Clock input to each stage (1 to 9). Data stored in this register 22 is thus shifted serially at every other zero mains crossing. This data is serially incident on the output gate 30 via output gating circuitry 40 (FIG. 7) such that odd states of the transmission timer counter 28 correspond to true data bits, and even states to their respective inverses, as shown in FIG. 12. For this purpose, the data, fed out from the first stage of the transmission register, passes to the output gating circuitry 40 where it is present at the input of a first "AND" gate 52, enabled at each odd state of the transmission timer, and, via a "NOT" gate, at the input of a second "AND" gate 53 enabled at each "EVEN" state of the timer. Outputs from gates 52 and 53 both feed an "OR" gate 56, data from which subsequently passes to gates 54 and 55 which control the insertion into the data sequence of the "start code".

The resultant data sequence enables (when "high") or disables (when "low") gate 30 which receives a continuous train of pulses of 120 kHz oscillations from the oscillator 37 of FIG. 4. Those pulses which pass through gate 30 constitute the required data signal which is passed onto the mains and transmitted between units of the system according to this embodiment of the invention.

The passage of these 120 kHz pulses through gate 30 is further controlled by a signal "ENABLE" shown for 60 Hz mains operation in FIG. 11 and produced by a Transmission Delay Timer 31 comprising an eight stage counter and a suitably coupled decoder. The counter is reset at every zero mains crossing by signal Trig $\phi 3$ and is clocked by $\phi 1$. This timer 31, by the signal "ENABLE" and gate 30, allows bursts of the 120 kHz oscillations for a predetermined length of time, in this embodiment for 1 millisecond, in predetermined spaced bursts. In this embodiment there are three equally spaced bursts in each half cycle of the main frequency (see FIG. 11).

When the counter 28 reaches state 22, a complete data message consisting of a start code, a housecode and an instruction (either device code or operation code) will have been serially incident at the output "SER. OUT", the bits corresponding to the housecode and the instruction being in alternate true and inverse form. An example of a typical such message is shown in FIG. 12. State 22 of counter 28 resets all but the sixth stage 75 of counter 28 of FIG. 8 to zero and attempts to set bistable B6 via gate 74. However until bistable B5 is set, bistable B6 cannot be set and so counter 28 continues to count through a further 22 states thereby repeating transmission of the whole message consisting of the "Start Code" and the data contained in the transmission register 22 of FIG. 9.

Sixth state 75 of the counter is not reset at state 22, as are the other stages, and so is able to be set during the second count up to 22 of the counter. Thus, bistable B5 is set when the message is being transmitted for the second time. So, on reaching state 22 for the second time, counter 28 is able to set B6 to produce a pulse "END" which disables gate 29 (FIG. 7) and stops production of signal C$\phi 3$, stopping the output of data from transmission register 22. If, however, when state 22 is reached for the second time, the key is still depressed, then B6 will not be set as gate 74 will be disabled due to the "low" output of gate 76, and the message will again be repeated.

If the instruction to be carried out is that of "BRIGHT" or "DIM", the "END" pulse is generated when the counter 28 just reaches state 22 as gate 74 will be enabled whether B5 is set or not due to the "BRIGHT" or "DIM" input (from FIG. 6) to gate 77. This allows the smallest increment of change in the brightness of a lamp being controlled to be that corresponding to the transmission of one message instead of two. The message repetition is however a generally advantageous feature in case of errors in the first transmission.

Once the "END" pulse is produced, counter 28 is allowed to count up to state 6 before gate 78 is enabled to reset bistable B4 which causes pulse TP2 to be generated by gate 51. These extra six states produce six blank time slots at output 'SER. OUT' to constitute an END CODE enabling receivers to determine the end of the message. Pulse TP2 then resets counter 28 and loads new data from gates 21 into the transmission register 22 (FIG. 7). It will be noted that the combination of Input Register 27 of FIG. 6, Transmission Register 22 of FIG. 7 and the bistables B2 of FIG. 6 and B3 and B4 of FIG. 8 form a two stage buffer store, enabling data to be entered into the Input Register 27 whilst other data is being transmitted from the transmission register 22. This is a useful feature of this embodiment as a full transmission takes 0.4 seconds to complete.

When the hand held transmitter unit (2 in FIG. 1) is used, data transmitted therefrom is entered into the integrated circuit chip, via the circuitry shown and described in relation to FIG. 2, at the serial input ("SER. IN") terminal shown in FIG. 8, which feeds the data pulses to an input code counter 32.

The hand held transmitter unit (2 in FIG. 1) is asynchronous and transmits data at a frequency of approximately 40 kHz. Three stage counter 34, shown in FIG. 9, detects the approximate frequency of the incoming pulses and responds to pulses in the region of 40 kHz by inhibiting the "BLOCK END" pulses which are continually produced in the absence of a signal at the serial input "SER.IN" and which continually reset counter 32. Hence on receipt of the appropriate frequency, counter 32 counts the number of pulses received in a train within the set frequency limits and generates output signals "1 BLOCK", "END CODE" and "VALID BLOCK", defining the nature of the data received, via gates 68 to 70 and bistables B20, B21 and B22 respectively.

The signal "VALID BLOCK" is only produced when an input data bit is detected by the counter 32 to have at least a preset number of pulses of the appropriate frequency. For example, in this embodiment, the preset number is 48 and a number detected as being between 48 and 160 is interpreted as a logic "zero" and a number greater than 160 as a logic "one", the latter causing a "1 BLOCK" signal to be generated and fed into the input register 27 (FIG. 6). The signal "VALID BLOCK" enables gates 72 and 73 to generate signal $\phi'$ which clocks the input register 27 so that data is serially shifted through the stages a to k thereof each time a valid signal is detected (i.e. "VALID BLOCK" is generated).

The signal "ENDCODE" is generated when counter 32 detects that a number of pulses corresponding to an "ENDCODE" (in this embodiment $6 \times 48 = 288$ pulses). This "ENDCODE" disables gate 73, therefore inhibiting production of signal $\phi'$ so that the input register 27 is no longer clocked, signifying that data in stages f to k thereof is ready for transference to the transmission register 22 (FIG. 7).

The data signal incident at "SER.IN" is in complete true form followed by complete inverse form, such that input register 27 now contains true data bits in stages f to k and respective inverse data bits in stages a to e. These bits are compared in comparator 35 to ensure that the message was received correctly. If the comparator 35 detects correspondence between respective true and inverse bits, it generates a signal "=" which appears at the input of "AND" gate 57.

Bistable 58 is provided to detect overflow in the input register 27, and only enables gate 57 to pass the "END-CODE" signal if it has not been set and if stages l and m of the register 27 contain logic "1" 's. These "1" 's are present as l and m when the register is fully loaded because the "S.R. RESET" signal when operative to reset the register 27, sets stage a thereof to "1" while resetting stages b to m to zero, and there is a start code at the beginning of a message transmitted from the hand held transmitter unit and incident at this input "SER.IN" which is detected as a "1 BLOCK" by the input code counter 32. The complete message is therefore entered into register 27 serially, behind two logic "1" bits. If the register is clocked too many times, stage m causes bistable 58 to set and the gate 57 is disabled so that bistable B2 is not set, and the "TRANSMIT" signal not produced.

It will therefore be seen that the hand-held unit 2 produces a signal of different form from that of the unit 1. Similar circuitry can nevertheless be used in unit 2, and as already mentioned the same integrated circuit chip 12 can contain all the circuitry needed for both functions, because much of the circuitry is common. Details of such a unit as the hand-held unit 2 can be obtained from U.S. application Ser. No. 704,367, assigned to the assignee hereof.

Figure 13:
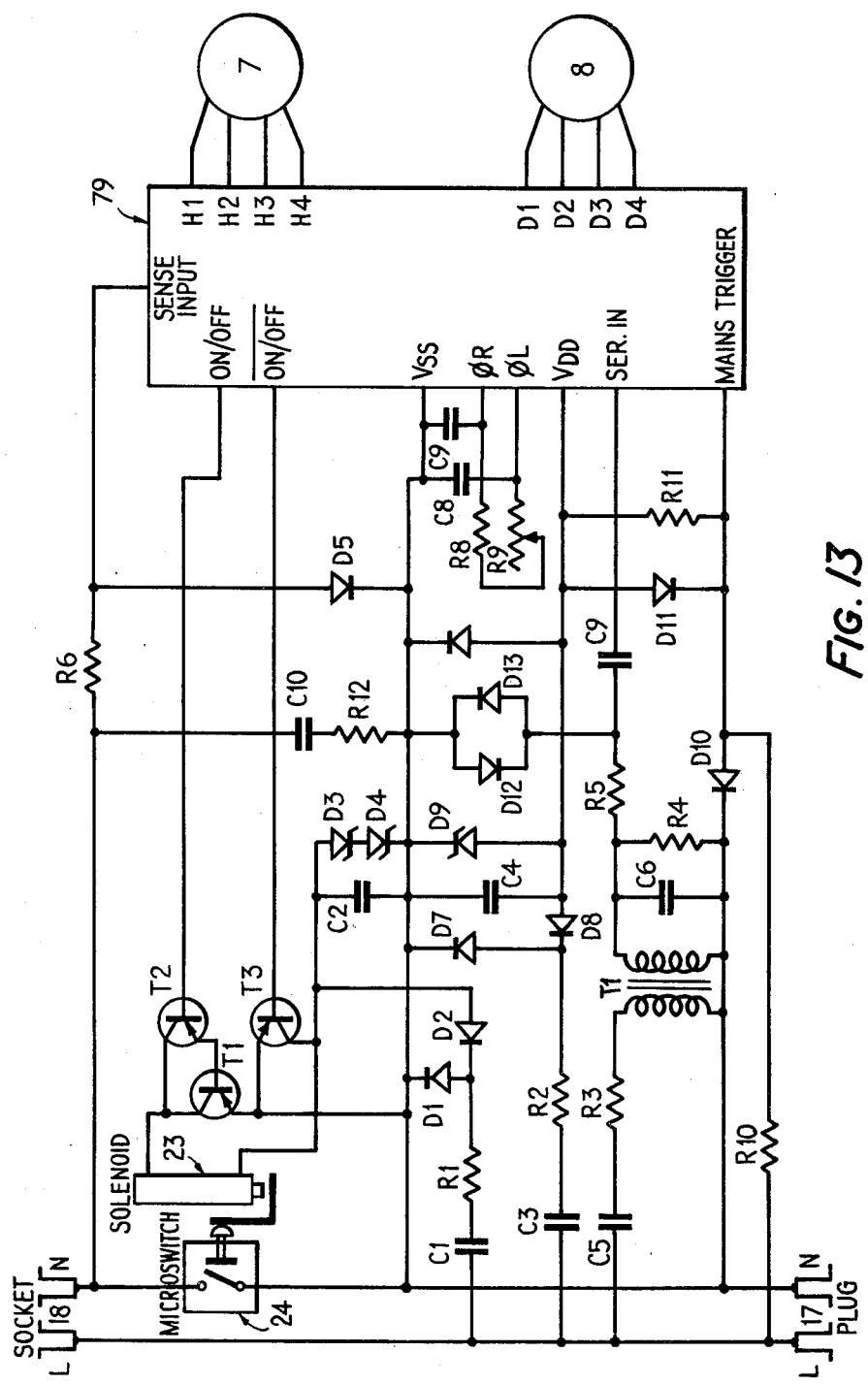
FIG. 13 is a circuit diagram of a slave unit of FIG. 1 for switching an appliance.

FIG. 13 is a diagram of a slave unit in the form of appliance unit 3 from FIG. 1. Such units will be plugged into power supply outlets throughout a house by way of two-pin plug 17 for each appliance to be controlled only in an "on-off" mode. So that the slave unit can act to control an appliance, it has a two-pin mains-type socket 18 into which the appliance 19 (FIG. 1) is connected. The slave unit incorporates an insulated gate field effect transistor integrated circuit 79 having a control signal output 'ON/OFF' connected to a solenoid 23 for activating a microswitch 24 coupled between the plug 17 and socket 18. This arrangement has a significant advantage over a conventional relay in that the 'snap' action of the microswitch allows a small contact mechanism to switch relatively high power and also has the added advantage that, although a relatively large force is required to initiate closure of the switch, only a small force is then required to sustain contact closure. Also connected to the integrated circuit are rotary switches (encoders) 7 and 8 which define the house code and the device code respectively.

The two-pin plug 17 provides the integrated circuit power supply via the circuit elements $C_3$, $R_2$, $D_7$, $D_8$, $C_4$ and $D_9$, and also provides a high voltage ($\approx 100$ V), low current (30 mA) supply to energise the solenoid via the elements $C_1$, $R_1$, $D_1$, $D_2$, $C_2$, $D_3$ and $D_4$. When the output socket is switched off, T3 switches this supply to ground, saving excessive dissipation in Zener Diodes D3,D4. When it is required to switch on the output socket, 200 milliseconds prior to activating the solenoid 23, T3 is rendered non-conductive, and after 200 milliseconds the solenoid supply has reached its 100 V and the Darlington arrangement T1,T2 is switched on by the circuit 79. The value of C2 is chosen to supply a large current pulse ($\approx$700 mA) into the solenoid for sufficient time to close the microswitch. Thereafter closure is maintained by the ability of this supply to provide 30 mA DC. The dissipation in this circuit configuration is minimal since the only time that either the solenoid or the power supply is required to handle large amounts of energy is during the switch closure, and this only takes approximately 10 milliseconds.

The slave unit receives the digital signals on the main as low level signals (100 millivolts minimum) at the plug 17 and these are passed to the integrated circuit 79 via a band pass filter comprising elements C5, R3, T1, C6, R4, R5. The band pass filter rejects 50/60 Hz but allows the 120 KHz signal through to the circuit 79. Capacitance C9 is provided as a DC block to the analogue amplifier on the integrated circuit 79. The unit also has appliance sense circuitry which comprises R6, C10, R12, D5, D6. It contains capacitor C10 to ensure a lagging voltage on the socket 18 with respect to the mains voltage when transformer type or inductive loads are being switched. R12 suppresses ground line noise when the microswitch closes and R6, D5 and D6 produce a clipped sine wave as a sense signal for the circuit 79.

The integrated circuit 79 is synchronised to the zero crossing point of the mains by a mains trigger signal which is a clipped sine wave of 16 V amplitude. The zero crossing is detected by the combination of resistors R10, R11 and diodes D10, D11, such that when the mains voltage is at zero, the mains trigger is at $-5$ V which is the threshold of the input gate of the integrated circuit 79.

Components R8, R9, C8 and C9 set the frequency of an internal clock (substantially as shown in FIG. 4) to 130 KHz.

Figure 14:
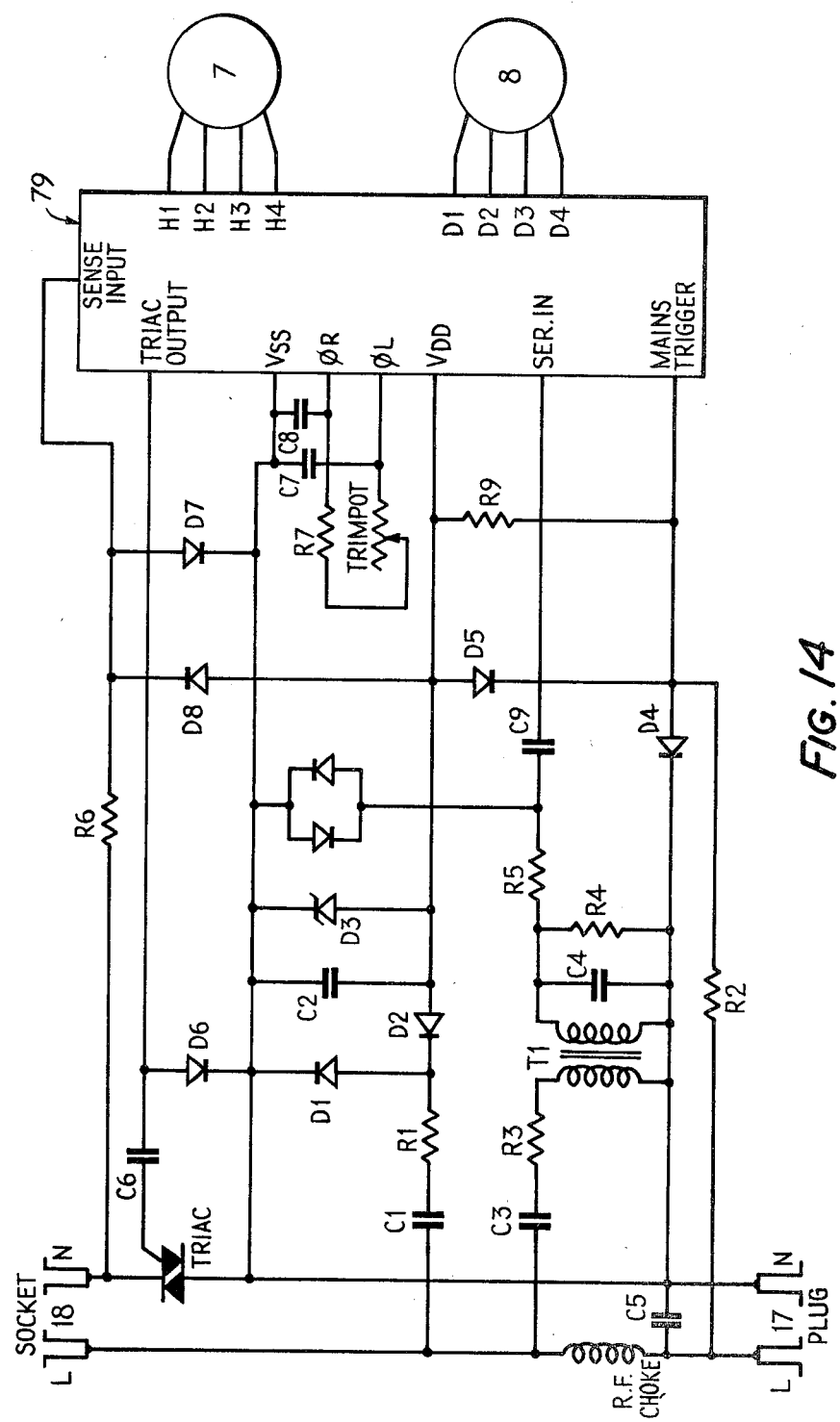
FIG. 14 is a circuit diagram of a slave unit of FIG. 1 for controlling a lighting appliance.

FIG. 14 is a circuit diagram of the components of a slave unit in the form of the dimmer unit 4 of FIG. 1. It comprises similar circuitry to that illustrated in FIG. 13 for the appliance unit 3 of FIG. 1 in that: the integrated circuit 79 is supplied with power via elements C1, R1, D1, D2, C2 and D3 coupled across the power mains at the plug 17; there is a band pass filter (C3, R3, T1, C4, R4, R5) which passes only the 120 KHz digital signal entering the circuit via the plug 17; and device codes and house codes are set up via the rotary switches (encoders) 7 and 8. Note that in this dimmer unit, a simplified 'sense' circuitry consisting of R6, D7 and D8 can be used. This is because when a light bulb is off no "Sense" input is present, and when switched on the bulb generates a sense signal of very nearly zero delay. This means that the loading capacitor needed in the unit of FIG. 13 is not required in the dimmer unit.

The plug and socket are connected by a triac fired when the triac output of the circuit 79 produces a positive-going pulse of 8 microseconds duration. This pulse couples through capacitor C6 to send a high current pulse into the gate of the triac to turn it on. After the 8 microseconds, the output of the circuit turns off and C6 is recharged. The triac control is a series of 8 microsecond pulses every 0.5 milliseconds for the first quarter of the mains cycle after the zero crossing point, if the first firing pulse occurs before $\pi/2$. This enables the dimmer unit to control low wattage bulbs because even if the triac fails to stay on after the first firing pulse, (because the mains voltage at that point in the cycle is too low to allow sufficient "holding current" for the triac), it must stay on after one of the succeeding firing pulses.

The mains trigger signal is provided by the elements R2, D4, D5, and R9.

Figure 15:
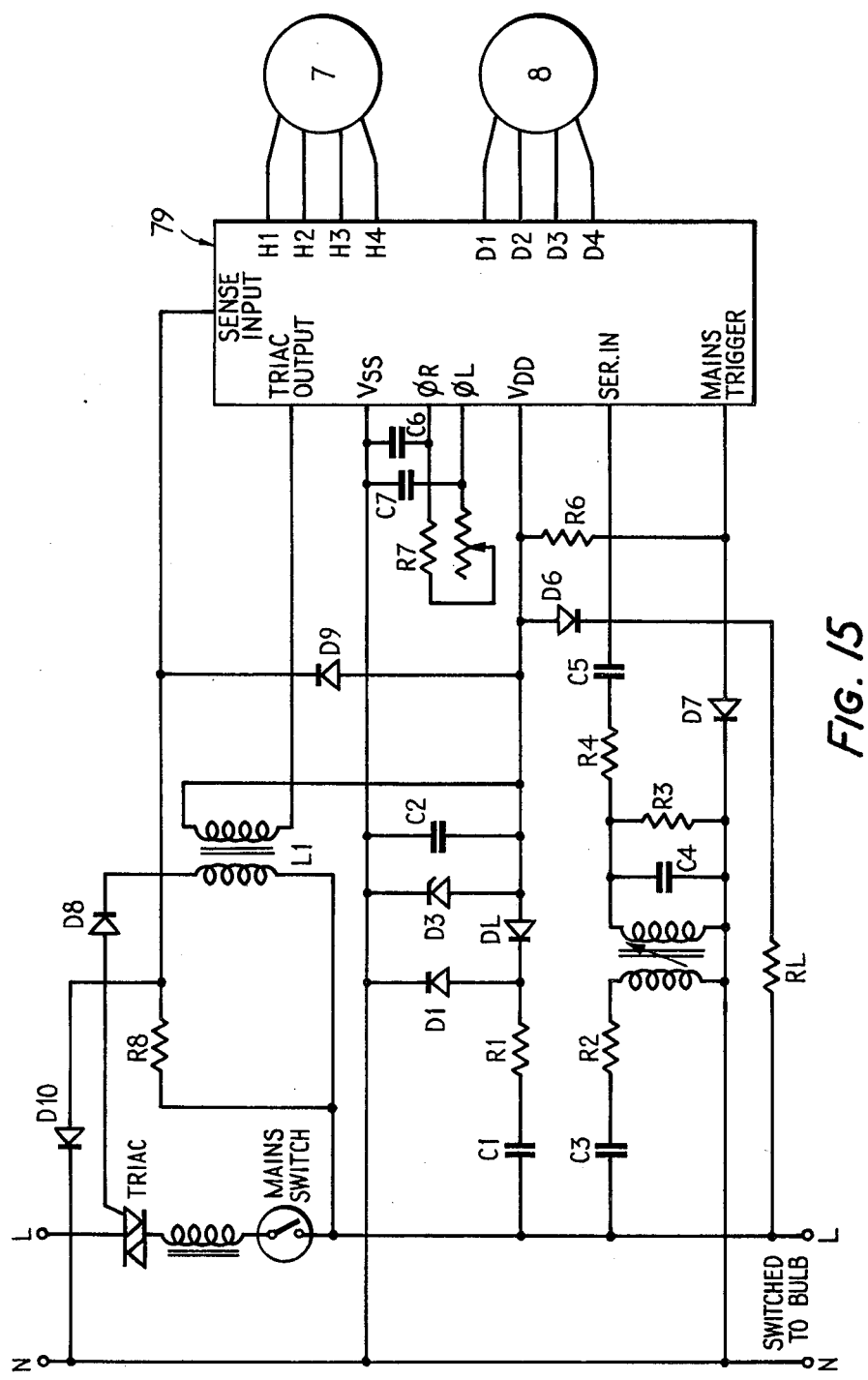
FIG. 15 is a circuit diagram of a slave unit of FIG. 1, in the form of a plateswitch lighting control unit.

FIG. 15 is a circuit diagram of the components of the plateswitch dimmer unit 5 of FIG. 1. Its operation is essentially the same as for the dimmer unit already described with the exception of the output configuration of the triac. In a plateswitch the only connection to the light is through a 'switched live' connection, and therefore the triac must be provided by this connection. A pulse transformer L1 provides the high voltage isolation required between the triac and the circuit 79.

FIGS. 16 to 19 are block circuit diagrams of the integrated circuit 79 of FIGS. 13 to 15, and FIGS. 20 and 21 are timing diagrams of the control pulses and other signals generated on and used in the integrated circuit 79.

A brief description of the components of FIGS. 16 to 19 and their interconnections will be followed by a description of the response of the components to relevant timing pulses and control signals.

Figure 16:
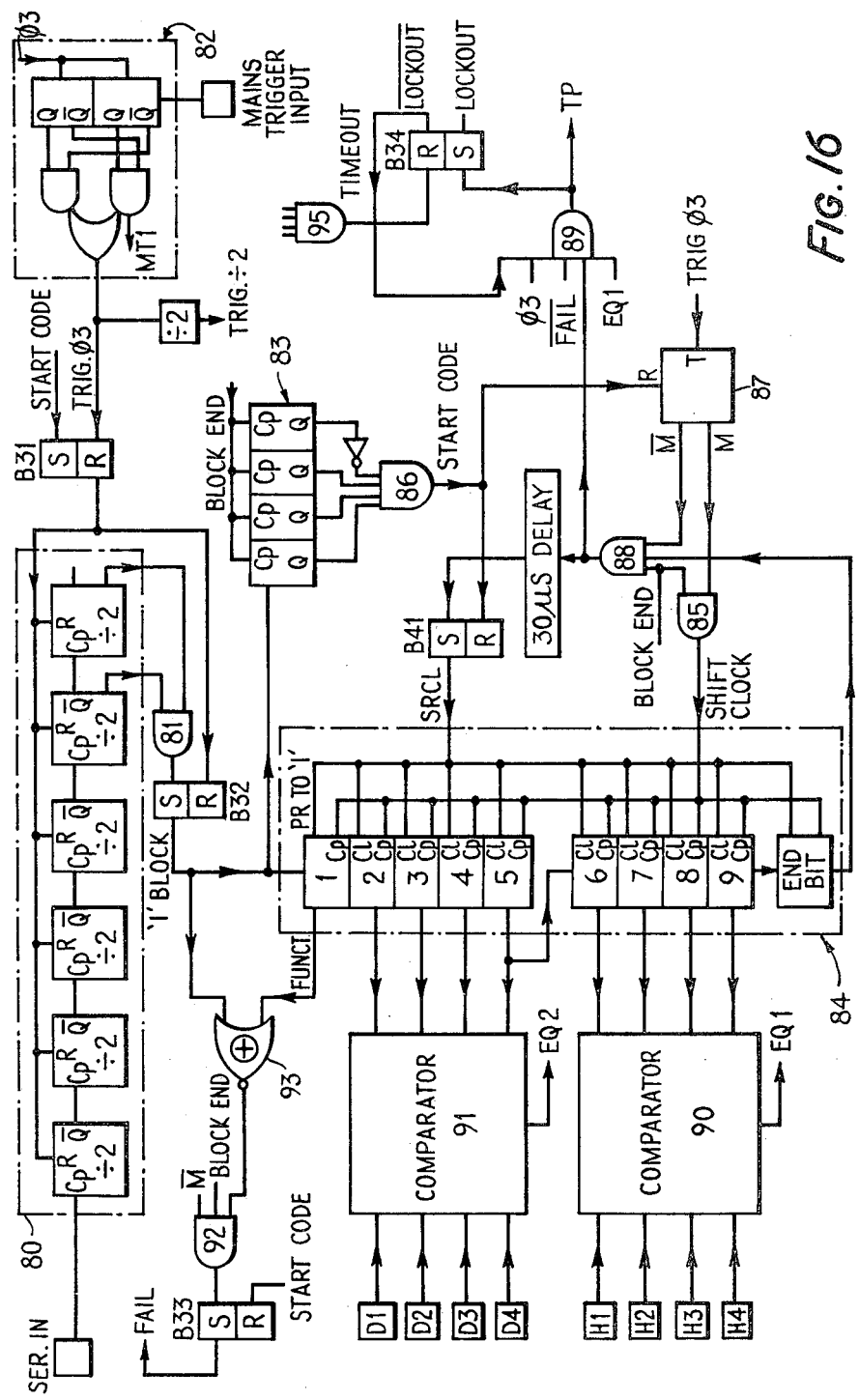
FIGS. 16–19 are block circuit diagrams of parts of the integrated circuit of FIGS. 13 to 15, FIGS. 20 and 21 are timing diagrams of signals received and generated by the integrated circuit of FIGS. 13 to 15.

In FIG. 16 the input "SER. IN" of the integrated circuit 79 of FIGS. 13 to 15 is connected to the clock pulse input of a counter 80. Counter 80 has reset inputs connected to the reset output of a bistable B31, set by a pulse "START" and reset by a pulse "TRIG $\phi$3". Decoding gate 81 (responsive to count 48 of counter 80) is connected to the set input of bistable B32 which is connected to an input register 84 and to a detection register 83. Circuit elements 93,92 and bistable B33, described later, detect correspondence between successive data bits, while comparators 90 and 91 respectively detect correspondence between housecodes and device codes. Input register 84 is clocked at every other mains zero crossing by the set output of bistable B41 which is connected to the final stage (END BIT) 117 of the register 84 through gate 88, and has reset inputs connected to the output of gate 85 which is fed by pulse "BLOCK END" and an output of toggle means 87.

Detection register 83 has decoding elements 86 (START CODE) and 95 (TIMEOUT). The latter is connected to the reset input of bistable B34, the reset output of which is connected to gate 89 which, when enabled, produces pulse "TP".

Figure 17:
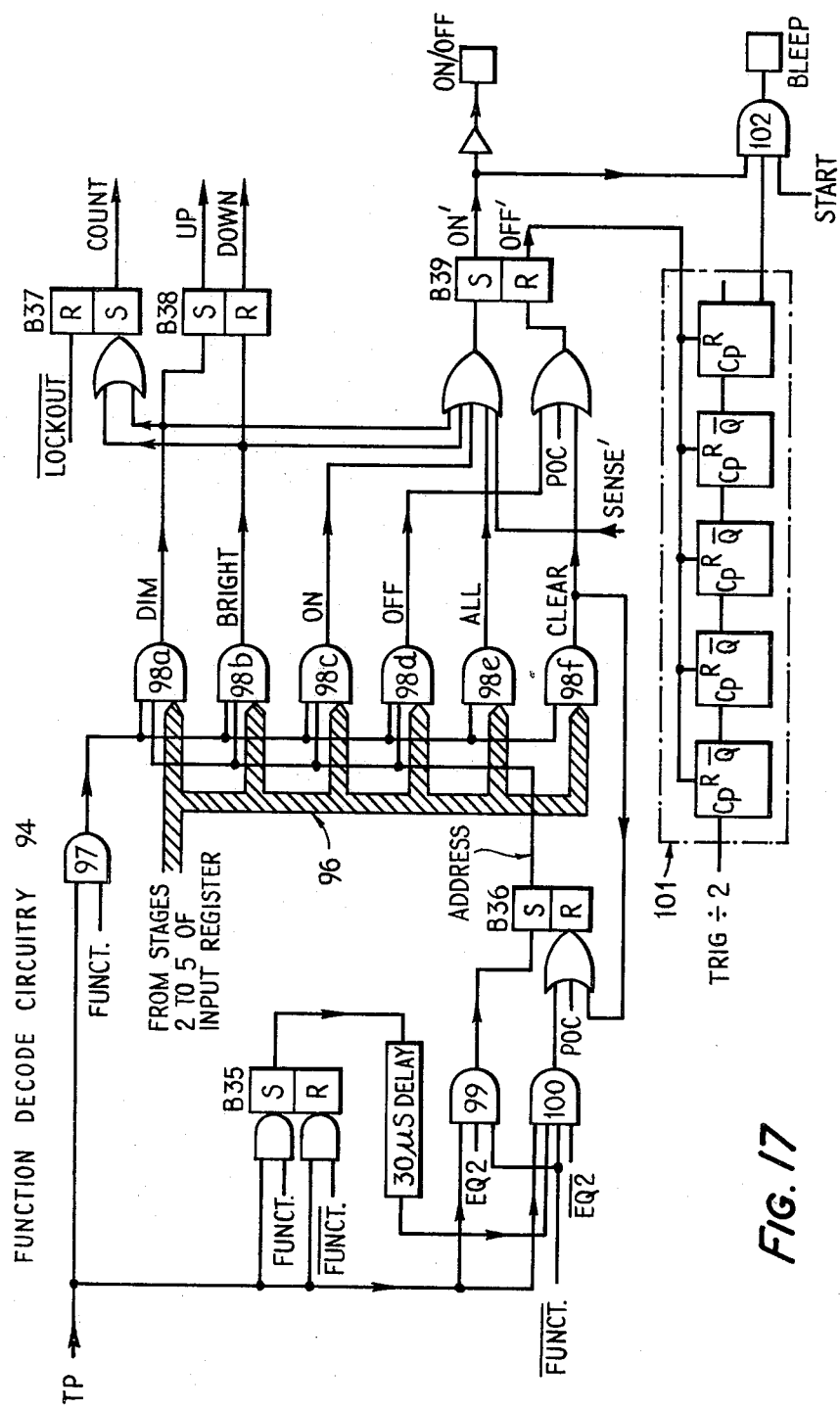

FIG. 17 shows function decode circuitry 94 consisting of function decoder 96 feeding gates 98 to produce signals representing a required operation (e.g. "DIM", "BRIGHT" and "ON"). The outputs of gates 98 are connected to bistables B37, B38 and B39 which generate signals "COUNT", "UP", "DOWN", "ON" and "OFF".

Bistables B35 and B36 connected together via gate 100 are provided for enabling an "ADDRESS" signal to be generated which signal feed gates 98a to d. Counter 101 is provided for selectively enabling gate 102 to generate a bleeping or alarm signal at the output "BLEEP". The counter 101 is reset by the signal 'OFF' and gate 102 is enabled by signal ON which is also connected to the "ON/OFF" output of the integrated circuit.

Figure 18:
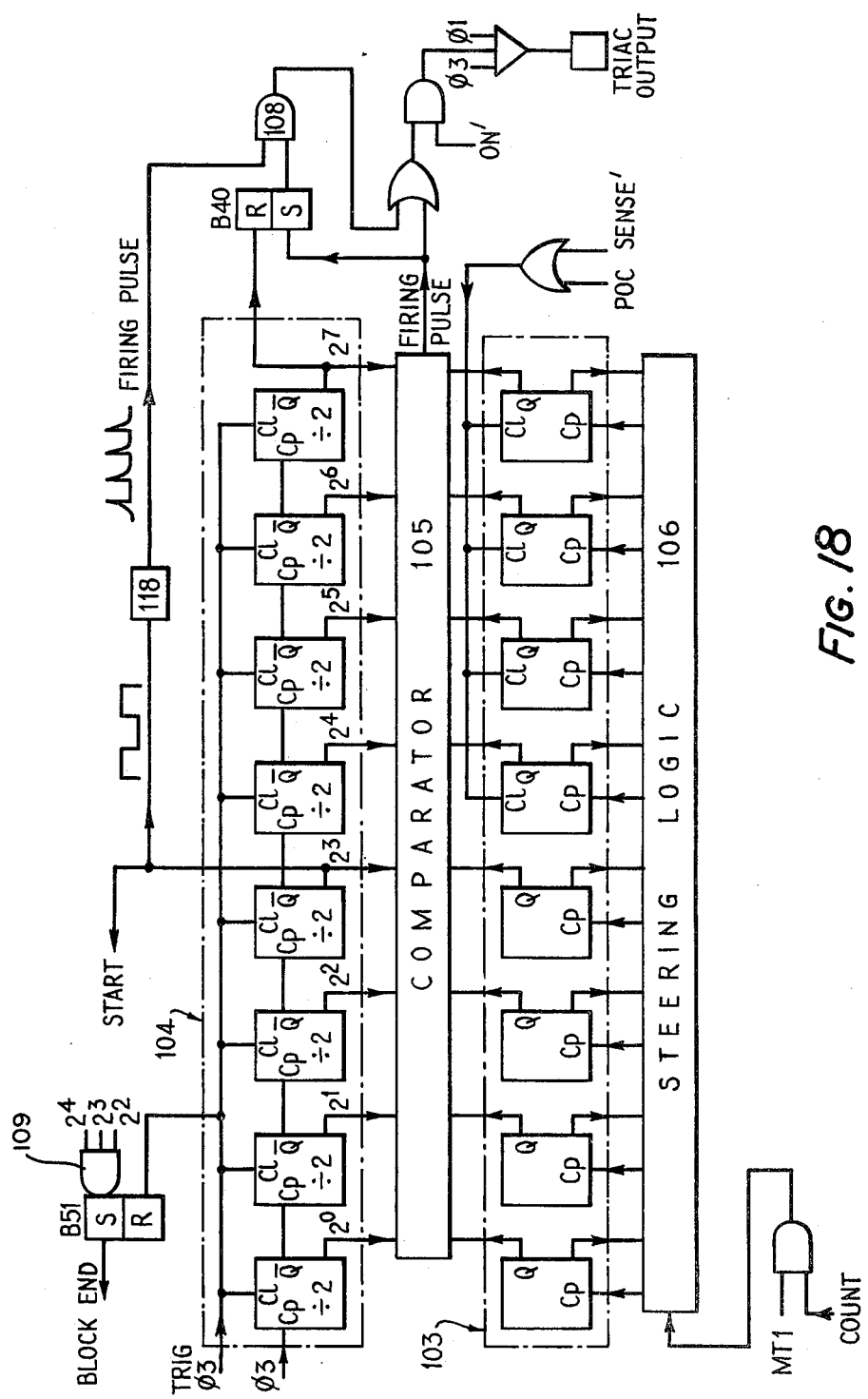

FIG. 18 shows the dimmer delay circuitry comprising steering logic 106 connected to up-down counter 103 which is connected to comparator 105 together with a binary UP counter 104. The output of comparator 105 is connected to the output "TRIAC OUTPUT" of the integrated circuit for feeding a pulse "FIRING PULSE" to a triac connected thereto. This output of comparator 105 is also connected to set bistable B40 (which is reset by the output of the eighth state ($2^7$) of counter 104) to enable gate 108 to pass a second form of the pulse "FIRING PULSE", to the output "TRIAC OUTPUT".

FIG. 18 also shows bistable B51 connected by a gate 109 to counter 104 to respond to a given count to produce pulse "BLOCK END".

Figure 19:
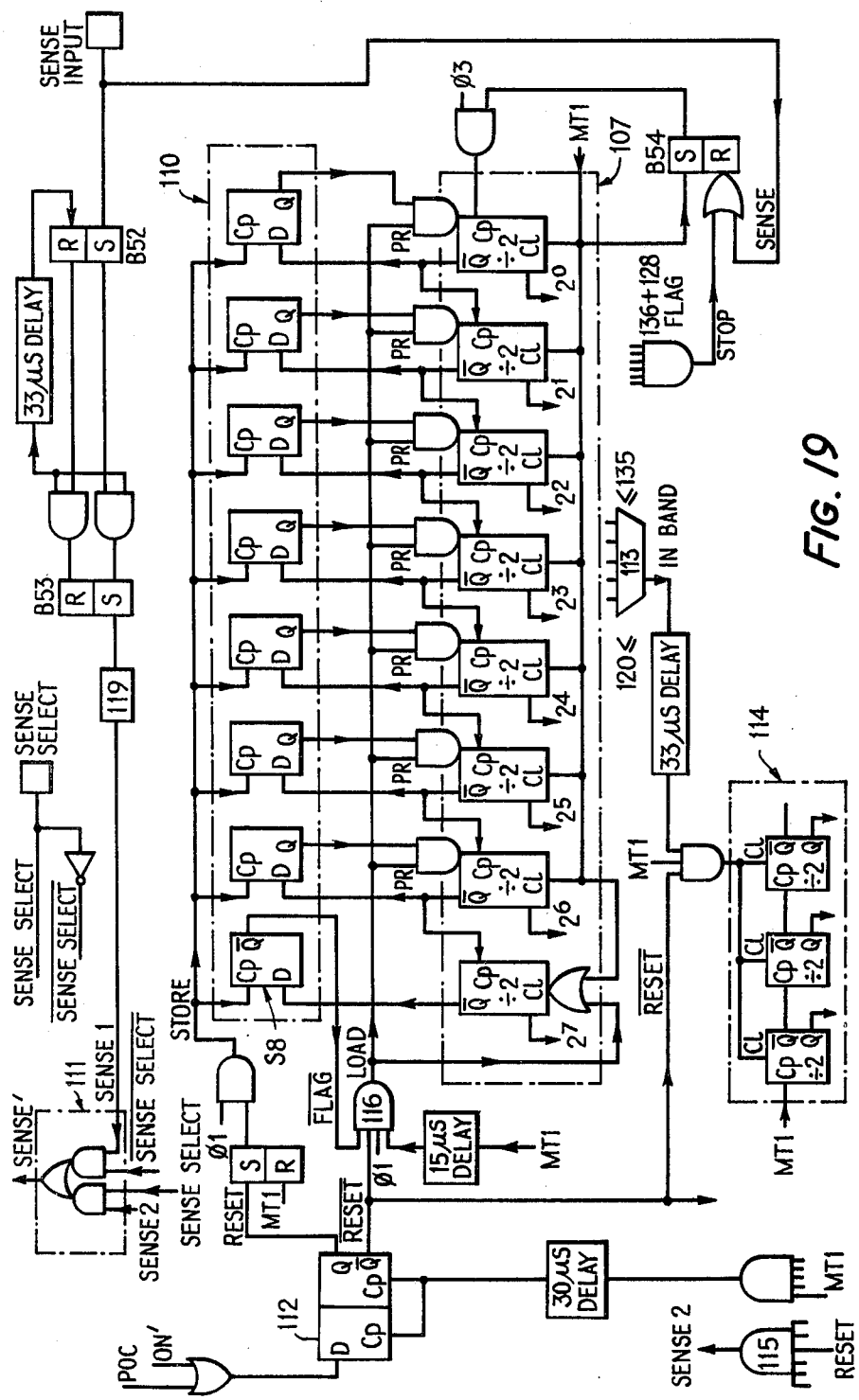

FIG. 19 shows circuitry for producing the signal "SENSE" which sets bistable B39 of FIG. 17 to generate the "ON" signal at the "ON/OFF" output of the integrated circuit. Via gating 111 this signal is generated on receipt of signal "SENSE 1" or "SENSE 2", the choice being determined by the presence or absence of a signal at the input "SENSE SELECT", dependant upon the type of power switch on the appliance concerned—as explained later.

The input "SENSE INPUT" is connected to bistables B52 and B53 via gating to generate the signal "SENSE 1", and to bistable B54 and counter 107, connected to store 110, to generate signal "SENSE 2" via decoding gate 115.

A more detailed description of the response of the circuitry described above will now be given.

Input "SER. IN" on the integrated circuit 79 receives data pulses and passes them to the counter 80 having six ripple through stages for counting up to "63". State "48" is sensed by decoding 'AND' gate 81. When a count of 48 is reached during the appropriate portion (determined by bistable B31) of a mains half-cycle a "one" is defined, otherwise a "zero" is assumed.

A null detection circuit 82, of identical form to that described with reference to 59 of FIG. 7, emits signal Trig φ3 the form of which is shown in FIGS. 21 and 22. Signal Trig φ3 resets bistable B31 thereby generating a signal which resets counter 80 and resets bistable B32. A signal "START" (shown in FIG. 20) is produced by the circuitry of FIG. 18 (to be described later) 260 μs after the mains zero-crossing point, to set bistable B31, allowing the counter 80 to count up incoming pulses. The delay of 260 μs is provided substantially to ensure that a burst has commenced before the counter 80 is allowed to count the pulses in the incoming signal, to allow for tolerances in the mains trigger between the transmitter unit and the slave unit.

A "BLOCK END" signal is produced by the circuitry of FIG. 18 890 μs after the mains zero crossing, to clock the detection register 83 and, via 'AND' gate 85, the input register 84. This delay causes only a part, more particularly six-tenths (approximately 72 pulses) of a burst to be examined. When 48 of these 72 pulses have arrived this is deemed sufficient to signify a "one".

The outputs of detection register 83 are decoded by 'AND' gate 86 to emit a "START CODE" signal when the pattern "1,1,1,0" is found. Signal "START CODE" resets bistable B41 and toggle means 87. When bistable B41 is reset, input register 84 is able to accept data from bistable B32, which is clocked serially through the stages 1 to 9 of the register 84 by signal "SHIFT CLOCK" which appears at the output of gate 85 on the condition BLOCK END. M (where M is an output of the toggle means 87), such that signal "SHIFT CLOCK" is produced every other half cycle. Bistable B41 is set after a delay of 30 μs by the condition BLOCK END. M.TP appearing at the input of 'AND' gate 88. Bistable B41 then produces signal SRCL which clears stages 2 to 9 of the register 84 and sets stage 1 thereof to "1". This "1" is then clocked through the stages of the register as data is entered from bistable B32. On reaching the final stage 'END BIT' 117 of the register this "1" causes a signal TP (shown in FIGS. 21 and 22) to be produced as it enables gates 88 and 89, provided that bistable B33 (FAIL) is not set and comparator 90 has detected a correct house code and generated the signal "EQ1". The bistable B33 (FAIL) is reset by the "START CODE".

A "FAIL" signal is produced if the Exclusive Nor gate 93 detects that the data bit entered into stage 1 of the register 84 is not followed in the second half mains cycle by its logical inverse, that is, if the condition M. BLOCK END exists at gate 92 when the inputs to gate 93 are either both "high" or both "low".

Signal "TP" generated by gate 89 according to the conditions described above and illustrated in FIG. 16, signifies that a correct message has arrived and is used to enable the function decode circuitry (94) of FIG. 17 for setting up the various controls within the slave unit integrated circuit ("BRIGHT", "DIM", "ON", "OFF" etc). Signal "TP" also sets bistable B34 (LOCKOUT) which disables gate 89 and inhibits further TP's until the TIMEOUT decoding gate 95 of the detection register 83 decodes the ENDCODE(0.0.0.0) and resets bistable B34. If a "FAIL" signal is produced by bistable B33, then TP is disabled and the rest of the circuit is prevented from receiving the message. The message 13, however, still clocked into the input register 84 until the '1' preset in stage 1 reaches "END BIT" and subsequently causes bistable B41 to clear the register 84 in readiness to receive a new message (or a repetition of the previous one), once the signal "START CODE" has been detected by register 83.

An operation code is distinguished from an address code (device code) as stage 1 of the input register 84 will contain a logic '1' at TP time (i.e. when the full message has been entered). This produces the signal "FUNCT" which enables gate 97 to pass TP and enables gates 98 to pass the decoded functions, decoded from the content of stages 2 to 5 of the input register 84 by the function decoder 96, to gates 98a to d ("DIM", "BRIGHT", "ON", "OFF") provided that an ADDRESS signal is also present at an input.

If stage 1 of the input register contains a zero, the signal "FUNCT" is not produced, so gate 97 and hence gates 98 are disabled. This signifies that a device code is present in stages 2 to 5 of the input register 84. If this agrees with the device code set at the slave unit inputs D1 to D4, the comparator 91 will produce a signal "EQ2" which enables gate 99, at TP time, when no "FUNCT" signal is present, to set bistable B36 to generate the signal "ADDRESS".

Bistable B36 is reset if at TP time, the condition FUNCT. EQ2 exists and B35 is set. When a device code is received bistable B35 is reset and gate 100 disabled, so that bistable B36 is kept set, even if the device code received is not that of the particular slave unit being described. This allows an operator to enter several device codes followed by a single operation code so that groups of appliances can be operated simultaneously.

The outputs of gates 98 are connected, as illustrated, to bistables B37, B38 and B39.

Bistable B37 is set by signal "DIM" or signal "Bright" to generate signal "COUNT", and reset by LOCKOUT (from bistable B34 in FIG. 16).

Bistable B38 is set by signal "DIM" to generate signal "UP" and reset by signal "BRIGHT" to generate signal "DOWN".

Bistable B39 is set by any of signals "DIM", "BRIGHT", "ON", "ALL" or "SENSE" (generated by the circuitry of FIG. 19 to be described later), to generate signal 'ON' which is passed to the "ON/OFF" output of the integrated circuit. Bistable B39 is reset by any of signals "OFF", "CLEAR" or "POC" to generate signal "OFF'".

Signal "OFF'" is connected to reset a counter 101 which is clocked by signal Trig ÷2, and connected through gate 102 to a "BLEEP" output of the integrated circuit. This output is suitable for activating an electromechanical "bleeper" or alarm. Gate 102 is enabled by signal "ON'" and signal "START" to provide a 320 ms burst of 2 KHz square waves followed by a 320 ms gap.

Signals "UP", "DOWN" and "COUNT" are connected to steering logic 106 to control the up-down counter 103, in FIG. 18, which is allowed to count whilst orders "BRIGHT" and "DIM" are being keyed. The state of this counter 103 determines the delay time after the mains null until a firing pulse is applied to the TRIAC via the "TRIAC OUTPUT" of the integrated circuit.

The counter 103 is only allowed to occupy states from 32 to 255.

Figure 20:
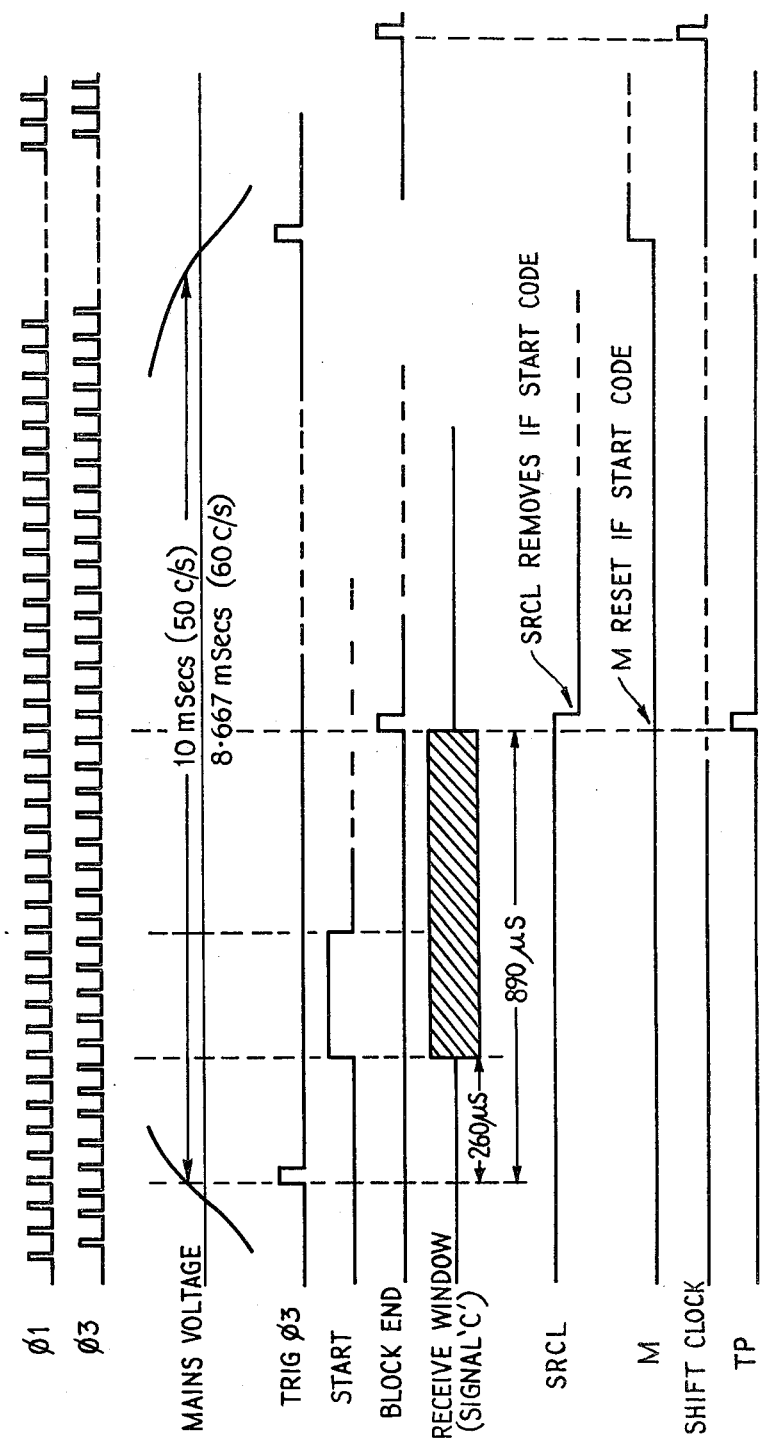

Counter 104 is a binary UP counter, reset at the mains zero crossing by pulses TRIG $\phi 3$ (shown in FIGS. 20 and 21), and clocked by pulse $\phi 3$ (shown in FIG. 20 ). Counter 104 counts until it reaches the state of counter 103, when a firing pulse is given to the output "TRIAC OUTPUT" from the comparator 105. The restriction on allowed states for counter 103, (between 32 and 255) provides for a delay in producing the pulse "FIRING PULSE" from between 1 and 8 msecs. after the mains zero crossing, which gives a reasonable variation in the brightness of almost any incandescent lamp controlled by the triac connected to the output "TRIAC OUTPUT" of the integrated circuit 79.

If the firing delay is less than 4 msecs., then the pulse "FIRING PULSE" from comparator 105 sets bistable B40 enabling 'AND' gate 108 to pass a pulse "FIRING PULSE" produced every 0.5 msec. by the counter 104 and shaped by a differentiating element 118, to take the form indicated in FIG. 18 and in FIG. 21. This has the advantage that very low wattage lamps can be operated without the bulb appearing to flash when the bulb brightness is increased toward maximum (minimum firing delay). The reason for this is that a property of a triac is that once a firing pulse has turned it on, provided that the current through it is greater than a certain minimum value (called the HOLDING CURRENT), then the triac will stay on even after the firing pulse is removed. This property is used by all light dimmer circuits. Where existing dimmers face a problem is when a low wattage bulb is being operated near to the maximum brightness. The triac firing pulse will then occur perhaps 1 to 2 milliseconds after the mains null, by which time the mains voltage may not have reached a sufficiently high value to allow the HOLDING CURRENT through the triac. The effect of this is that the bulb will appear to go from being very bright to virtually out—even though the light dimmer is set to a "BRIGHT" value. This system overcomes this by sending multiple triggers in the first 4 milliseconds of each half mains cycle. This means that even if the triac does not hold on with the first firing pulse, eventually a pulse will occur when the mains voltage is at a sufficiently high value to sustain the HOLDING CURRENT. The bulb will therefore appear to stay bright.

Counter 104 also generates the pulse "START" referred to above with reference to FIG. 16, at the output of the fourth stage of the counter 104, 260 $\mu$secs after the mains zero crossing. Decoding gate 109 sets bistable B51 when appropriate states of counter 104 are reached, to generate the pulse "BLOCK END" 890 $\mu$sec after the mains zero crossing. Bistable B51 is reset by pulse "TRIG $\phi 3$" at each mains zero crossing.

FIG. 19 is a diagram of sense logic of a slave unit enabling manual operation of an appliance when coupled to a slave unit.

Most power switches break the power connector to the appliance completely and in this case, when the power switch is closed, the full mains voltage itself appears at the neutral return of the socket whilst the socket is turned off. When the power switch is open, no signal appears at the neutral return of the socket. For this case the circuitry producing "sense 1" can be used. The voltage at the socket is clipped between OV and VDD before feeding to the input "SENSE INPUT". Bistables B52 and B53 detect the 0-1 change at the "SENSE INPUT". On each 0 to 1 transition of the mains a signal "MT1" is produced by the null detection circuit 82 of FIG. 16 and B52 is reset. Any subsequent "SENSE INPUT" with the next "MT1" will set B52. On production of MT1", B52 is clocked into B53 and differentiating circuitry 119 detects the 0 to 1 transition of B53 to provide a pulse "SENSE 1" which sets bistable B59 of FIG. 17 via gates 111.

On certain equipment such as some T.V.'s or stereo units, however, the power switch to the unit is placed in the secondary of the power transformer. In this case a voltage will appear at the neutral return on the socket whether or not the power switch on the appliance is ON or OFF. A more general way of detecting a power switch closure, therefore, which copes with the cae just discussed, and the more usual case when a power switch fully disconnects the appliance, is to detect the phase change between the mains voltage and sence return when the power switch is closed. A capacitor e.g. C10 of FIG. 13 ensures that the signal at the input "SENSE INPUT" crosses zero after the mains voltage and therefore it is possible to digitally time the delay between MT1 and the signal at the input "SENSE INPUT" going from 0 to 1. The logic associated with generating "SENSE 2" measures this delay and detects when a change occurs (either an increase or a decrease) consistently for more than 8 main cycles. This ensures that noise transients do not generate a "SENSE 2", since the logic looks for a consistent delay change over a period of time. It has been found experimentally that the smallest change in delay that the circuitry must detect [with C10, (FIG. 13) =0.1 $\mu$f] is 250 microseconds.

Counter 107 is reset at every pulse "MT1", and counts $\phi 3$ pulses until stopped when bistable B54 is reset by a signal "SENSE" at the input "SENSE INPUT". Thus it records a count number proportional to the delay between signal "SENSE" and the mains zero crossing. Consider, first, the case where the power switch of the appliance only switches the secondary transformer. In this case a signal "SENSE" at "SENSE INPUT" will always be present. Assume the power switch on the appliance is turned off. Either immediately after the slave unit is plugged in, or whilst the output socket is switched on, SHIFT REGISTER 112 causes a "STORE" signal to be applied to store 110. This continually stores the contents of counter 107 in store 110. Once the "POWER ON CLEAR" ("POC")

signal is removed (600 milliseconds after POWER ON), having caused the output socket to be switched off, or after the socket is turned off remotely, shift Register 112 ensures that the "STORE" signal is not removed for at least a further 8 counts of counter 107. This gives signals at the "SENSE INPUT" time to stabilise after the socket is switched off. The result is that when signal "STORE" is removed, a number is locked into store 110 which number represents the "SENSE" delay with the appliance power switch "OFF". This number will now be compared continuously with the count in counter 107 and a signal "SENSE" will be generated when the two counts differ by more than 8 (representing ±250 microseconds) for 8 consecutive mains cycles. This eliminates substantially any noise spikes being able to cause signal "SENSE". If the appliance power switch is in the "ON" position, either when the receiver is plugged in or when the socket is remotely turned off (a common condition), then when the power switch is turned off it produces a signal "SENSE" and turns on the socket. The next time the power switch is turned "ON", however, it therefore brings the appliance "ON" as before.

Having stored a number in store 110 (assumed to be a number <128 or 4 milliseconds of delay), in order to make a comparison between it and any new count, on receipt of signal "MT1", the complement in store 110 is loaded into counter 107, except for stage 8 of the counter 107 which is cleared to zero. When signal "SENSE" sets bistable B54 and stops counter 104, the count number will be 128 if no change in the "SENSE" signal delay has occurred. If the "SENSE" delay has decreased the count will be less than 128, and if it has increased the count will be greater than 128. An "IN BAND" decoder gate 113 decodes 120≦ count ≦135 indicating that the count number and stored number are within ±8. "IN BAND" signals cause counter 114 to be reset and inhibit generating "SENSE". If the "SENSE" delay decreases by more than 250 microseconds the count in counter 107 will generate signal "STOP" at less than state 120, and if the "SENSE" delay increases by more than 250 microseconds the "STOP" signal causes counter 107 to stop at 136. Both cases inhibit "IN BAND" signals so allowing counter 114 to count. When counter 114 reaches state 7 (i.e., 7 consecutive signals are out of band) gate 115 decodes state 7 to generate signal "SENSE 2". Once bistable B39 (FIG. 17) is set further "SENSE 2"'s are inhibited and "STORE" signal is again applied to store 110. The circuit now continually stores the contents of counter 107. When the socket is next switched off remotely, a minimum of 8 full mains cycles later, "STORE" is removed recording another number in store 110 with which to compare the "SENSE" delay. Once the "STORE" signal is removed (RESET—0), after the next signal "MT1", signal "LOAD" is produced by gate 116 which signal loads the complement of store 110 (except stage S8) into counter 107. The system is thus back looking for a change in the "SENSE" delay.

The case when the power switch on the appliance breaks the power connection is a separate case. In this case, when the power switch is OFF, no "SENSE" is applied to bistable B54. Thus whilst the "STORE" signal is high the counter 107 will exceed 128 and stage S8 of store 110 will be set. This causes bistable B54 to stop at 128. Thus when the socket is switched off remotely or after "POWER UP", the removal of "STORE" signal leaves the count of 128 in STORE 110. After the socket is switched off and "STORE" removed, signal "LOAD" is inhibited as signal "FLAG" is produced and logic '0' is applied to counter 107. Provided that the power switch is not closed on the appliance (and no "SENSE" is applied) signal "STOP" will reset bistable B54 at state 128 of counter 107 which causes signal "IN BAND" to be generated. When the power switch is closed the "SENSE" delay must be less than a count of 128 generally it will be close to zero), and no "IN BAND" signals will be provided, allowing counter 114 to count and eventually causing a signal "SENSE 2" to be produced.

We claim:

1. An electrical appliance control system for controlling electrical appliances within a building and comprising:
   (a) a power main of the building;
   (b) a plurality of power outlets of the main;
   (c) a transmitter unit having:
      (1) input means for entering any one of a plurality of addresses into the transmitter unit;
      (2) means for generating, synchronously with the mains voltage, a multibit digital signal, comprising a multibit digital address signal representing an entered address, the digital signal being modulated on a carrier the frequency of which is a plurality of times greater than mains frequency, so that the bits of the digital signal comprise predetermined numbers of cycles of the carrier, the predetermined numbers depending upon the bit values, and a period within each bit occurring near a zero crossing point of the mains voltage; and
      (3) output means for coupling the modulated digital signal onto the main; and
   (d) at least one slave unit for controlling the supply of power to appliances and having:
      (1) means for defining an address for that slave unit;
      (2) a power input coupled to the main within the building;
      (3) means for receiving from said power input said digital signal;
      (4) means for recognizing the logical values of the bits of the received digital signal by counting during said period the number of cycles of the carrier and determining the value of the bit in dependence upon which of two non-overlapping number ranges contains the counted number; and
      (5) means for comparing the digital address signal received by the receiving means with the address of the defining means and for rendering the slave unit operable to effect an appliance power supply control operation when correspondence is found between said address and the digital address signal;
   (e) at least one of the transmitter and slave unit being releasably coupled to a power outlet of the main so as to be usable optionally at various placed within the building.

2. A system as claimed in claim 1, wherein said input means of the transmitter unit is also operable to enter a desired appliance power supply control operation; and wherein said means for generating is further operable for generating, as part of said multi-bit digital signal, a digital operation signal representing the defined operation and for supplying said digital operation signal to the output means for injection onto the main; and at least one slave unit comprising: means responsive to a received digital operation signal, when the slave unit has been rendered operable by a digital address signal, to effect an appliance power supply control operation as defined by the digital operation signal.

3. A system as claimed in claim 2, wherein at least one slave unit has a lighting dimmer control arrangement coupled to be controlled by the responsive means in dependence upon a received digital operation signal, and the input means of the transmitter includes means for entering desired dimming and brightening operations for encoding in the digital operation signals.

4. A system as claimed in claim 2, wherein the input means comprises a keyboard for entering said appliance power supply control operation and any one of said plurality of slave unit digital addresses.

5. A system as claimed in claim 4, wherein the input means comprises an ultrasonic receiver by which data can be entered into the transmitter unit.

6. A system as claimed in claim 2, wherein the transmitter unit comprises:
means for including in each digital signal a system code; and
each slave unit comprises:
means for defining a system code; and
means for comparing the defined system code with the system code in a received digital signal and for responding to a correspondence between the system codes as a condition for response of the slave unit to other data in the received digital signal.

7. A system as claimed in claim 6, wherein the generating means comprises means for producing each digital signal as a combination of data in its logical true and logical inverse forms, and each slave unit comprises a comparator for comparing the true and inverse forms and for enabling the slave unit to respond only when correspondence between the true and inverse forms is detected.

8. A system as claimed in claim 7, wherein the generating means is operable to cause each digital address signal and a given range of the digital operation signals to be transmitted onto the main at least twice.

9. A system as claimed in claim 7, wherein each slave unit comprises: an address memory to store the acceptance of an address by the comparing means to render the slave unit operable to effect an appliance power supply control operation; and means for clearing the memory on the condition that a subsequent digital operation signal has been received and accepted.

10. A system as claimed in claim 9, wherein the clearing means is operable to clear the memory when another address is detected following response to said subsequent digital operation signal.

11. A system as claimed in claim 9, wherein at least one slave unit has a power outlet for connection to an appliance having an operating switch and sensing means for energising said power outlet on sensing at said power outlet a condition indicative of the operation of the operating switch of an appliance.

12. A system as claimed in claim 2, wherein the generating means comprises means for producing each digital signal as a sequence of bits every other one of which is followed in the sequence by its logical inverse, and each slave unit has a comparator for comparing the alternate bits with the intermediate bits to enable the slave unit to respond only when correspondence is detected by said comparator.

13. A system as claimed in claim 12, wherein the generating means is operable to precede each digital signal with a digital start code also modulated on said carrier, and each slave unit has means for detecting said start code to identify the beginning of the digital signals.

14. A system as claimed in claim 13, wherein the transmitter unit comprises means for enabling each digital signal to be transmitted onto the main at least twice.

15. A system as claimed in claim 2, wherein the transmitter unit comprises a plug for plugging into one of said power outlets and a transformer coupling the plug to the output means.

16. A system as claimed in claim 2, wherein each slave unit has a transformer coupling the power input to the receiving means, and at least one slave unit has a plug coupled to the power input for plugging the unit into one of said power outlets.

17. A system as claimed in claim 2, wherein the transmitter unit is operable to produce at least one digital operation signal in a form constituting a general operation command, and a plurality of slave units each comprising means responsive to detect and act on said general operation command without prior response to a digital address signal.

18. A system as claimed in claim 2, wherein at least some slave units comprise an address latch to store the receipt of the address of that slave unit and means for resetting the latch when another address is detected following response to one of said digital operation signals, whereby a group of slave units can be addressed in sequence for control by a single digital operation signal.

19. A system as claimed in claim 2, wherein at least one slave unit comprises a power outlet, means for applying a test voltage to said outlet and sensing means for energising said outlet with mains voltage on sensing a given change in a parameter of said test voltage indicative of the actuation of an operating switch of an appliance when connected to the outlet.

20. A system as claimed in claim 12, wherein at least one slave unit comprises a power outlet, means for applying a test voltage to said outlet and sensing means for energising the outlet with mains voltage on sensing a given phase change in said test voltage.

21. A system according to claim 7, wherein the generating means is operable to produce the bits of the digital signals in respective time intervals synchronized with the mains voltage, a bit of one logic value being produced as a given number of cycles of the carrier in one of said time intervals and a bit of a second logic value being produced as an absence of cycles of the carrier in one of said time intervals.

22. A system as claimed in claim 21, wherein the recognizing means of each slave unit has counting means for counting carrier cycles only within said time intervals to identify the logic values.

23. A system as claimed in claim 22, wherein the generating means produces each of said bits for a first time period within an interval and said counting means is operable to count pulses in a second time period within an interval, said second time period being shorter than and within the first time period relative to mains voltage zero-crossing points.

24. A system as claimed in claim 2, wherein the bits are transmitted within periods containing a zero-crossing point and each of a duration no greater than one eighth of a half-cycle of mains voltage.

25. A system as claimed in claim 24, wherein the generating means repeats each bit twice in one half-cycle of mains voltage, the transmitter unit comprising a timer to time said repetitions to occur substantially 60° and 120° after the beginning of the half-cycle.

26. A transmitter comprising:
input means for entering data defining an address and an appliance operation;
signal output means for connection to a power outlet socket of a domestic power main; and
generating means coupled to the input and output means to produce, at the output means and in synchronism with mains voltage, digital signals defining said data comprising data bits modulated on a carrier having a frequency a plurality of times greater than mains frequency so that bits comprise predetermined numbers of cycles of the carrier, the predetermined numbers depending upon the bit values, and the bits existing within time periods containing a zero-crossing of the mains voltage and each period of a duration no greater than one-eighth of a half-cycle of mains voltage.

27. A slave unit comprising:
electrical plug pins for plugging the unit into an outlet socket of a domestic electrical power main;
means for connecting the power input of an electrical appliance to the unit;
a current control device coupled between the pins and the connecting means to control the energisation of the appliance;
means for defining an address for the unit; and
means responsive to a multibit digital signal arriving at the pins, modulated on a carrier having a frequency a plurality of times greater than mains frequency the responsive means including counting means for counting the number of cycles of the carrier in periods which are short in relation to a half-cycle of the mains voltage and which are near zero crossing points of the mains voltage;
means for determining the values of the bits in dependence upon which of two non-overlapping ranges contains the counted numbers for said periods;
and a comparator for comparing the address defined by the defining means with one portion of the digital signal and for producing a signal to control the current control device in dependence upon another portion of the digital signal when correspondence is found between said address and said one portion of the digital signal.

28. A slave unit comprising:
means for coupling the unit to a domestic power main;
means for connecting a lighting appliance to the unit;
a light intensity control device coupled between the coupling and connecting means for controlling the brightness of a lighting appliance;
means for defining an address of the unit;
means responsive to a multibit digital signal arriving at the coupling means, modulated on a carrier having a frequency a plurality of times greater than mains frequency, the responsive means including counting means for counting the number of cycles of the carrier in periods which are short in relation to a half-cycle of the mains voltage and which are near zero crossing points of the mains voltage, means for determining the values of the bits in dependence upon which of two non-overlapping ranges contains the counted numbers for said periods and a comparator for comparing a first, address, portion of the digital signal with the defined address and for operating the control device in dependence upon another, control, portion of the digital signal arriving at the coupling means when correspondence is found between the address and said first portion of the digital signal.

29. A slave unit as claimed in claim 28, comprising:
means for counting the number of repetitions of one of a digital dimming and brightening operation signal received and for controlling the extent of operation of said lighting intensity control device in dependence upon the number of repetitions counted.

30. A system as claimed in claim 3, wherein said generating means of the transmitter is arranged to generate the digital operation signals representing dimming and brightening operations repeatedly while said dimming and brightening operations are being entered in the input means, and the responsive means of said at least one slave unit comprises counting means for counting the number of repetitions of a received digital operation signal representing one of a dimming and a brightening operation, and is arranged to control the extent of dimming and brightening in dependence upon said number of repetitions counted.

31. A transmitter comprising:
input means for receiving data defining an address and an appliance operation;
means coupled to the input means for generating, synchronously with the mains voltage, multibit digital signals so that bits comprise predetermined numbers of cycles of a carrier having a frequency a plurality of times greater than mains frequency, the predetermined numbers depending upon the bit values, a period within each bit occurring near a zero crossing point of the mains voltage, and the digital signal defining said address and said appliance operation; and
an electrical plug coupled to the generating means for plugging into a power outlet socket of a domestic power main to inject said digital signals onto said main.

* * * * *